US012811695B2

(12) United States Patent
Ahn et al.

(10) Patent No.: US 12,811,695 B2
(45) Date of Patent: Nov. 24, 2026

(54) METHOD AND APPARATUS FOR PERFORMING QUANTUM SECURE DIRECT COMMUNICATION BY USING HIGH-DIMENSIONAL QUANTUM STATE BASED ON POLARIZATION AND PHASE INFORMATION IN COMMUNICATION SYSTEM

(71) Applicant: LG Electronics Inc., Seoul (KR)

(72) Inventors: Byungkyu Ahn, Seoul (KR); Sangrim Lee, Seoul (KR); Hojae Lee, Seoul (KR)

(73) Assignee: LG Electronics Inc., Seoul (KR)

(*) Notice: Subject to any disclaimer, the term of this patent is extended or adjusted under 35 U.S.C. 154(b) by 141 days.

(21) Appl. No.: 18/712,923

(22) PCT Filed: Nov. 23, 2021

(86) PCT No.: PCT/KR2021/017310
§ 371 (c)(1),
(2) Date: May 23, 2024

(87) PCT Pub. No.: WO2023/095933
PCT Pub. Date: Jun. 1, 2023

(65) Prior Publication Data
US 2025/0030487 A1 Jan. 23, 2025

(51) Int. Cl.
*H04B 10/70* (2013.01)
*H04B 10/532* (2013.01)
*H04B 10/548* (2013.01)

(52) U.S. Cl.
CPC ........... *H04B 10/70* (2013.01); *H04B 10/532* (2013.01); *H04B 10/548* (2013.01)

(58) Field of Classification Search
CPC .... H04B 10/532; H04B 10/548; H04B 10/70; H04L 9/001; H04L 9/0852
See application file for complete search history.

(56) References Cited

U.S. PATENT DOCUMENTS 8,509,446 B2 * 8/2013 Fujiwara ............... H04L 9/0858 380/278
10,511,437 B1 * 12/2019 Ustimchik ............ H04L 9/0858
(Continued)

FOREIGN PATENT DOCUMENTS

CN 205961140 U * 2/2017
KR 20180025621 A * 3/2018 ............. H04B 10/70
(Continued)

OTHER PUBLICATIONS

Nakassis SPIE 8400 (Year: 2012).*
(Continued)

*Primary Examiner* — David C Payne
*Assistant Examiner* — Mohammed Abdelraheem
(74) *Attorney, Agent, or Firm* — Fish & Richardson P.C.

(57) ABSTRACT

In order to perform quantum secure direct communication using a high-dimensional quantum state quantum state based on polarization and phase information, a method performed by a first device in a communication system may comprise establishing a classic channel with a second device using a random access (RA) preamble and an RA response (RAR) message, receiving a forward pulse including photons in an initial quantum state from the second device, and transmitting a backward pulse representing a plurality of bits per photon by performing phase modulation and polarization modulation on the photons based on assistance of the classic channel.

17 Claims, 21 Drawing Sheets

(56) References Cited

U.S. PATENT DOCUMENTS

| | | | | |
|---|---|---|---|---|
| 11,032,009 | B1 * | 6/2021 | Lee | H04B 10/11 |
| 11,502,758 | B2 * | 11/2022 | Bucklew | H04B 10/6166 |
| 2016/0277183 | A1 * | 9/2016 | Murakami | H04L 9/0858 |
| 2017/0293082 | A1 * | 10/2017 | Mower | H04B 10/40 |
| 2019/0312723 | A1 * | 10/2019 | Guo | H04B 10/70 |
| 2020/0313879 | A1 * | 10/2020 | Hong | H04L 9/0852 |
| 2022/0271846 | A1 * | 8/2022 | Bucklew | H04B 10/697 |

FOREIGN PATENT DOCUMENTS

| | | | | |
|---|---|---|---|---|
| KR | 101965184 B1 * | 4/2019 | | H04B 10/70 |
| KR | 102134347 B1 * | 7/2020 | | H04B 10/5561 |
| WO | WO 2013048137 A3 * | 4/2013 | | H04W 74/0833 |
| WO | WO-2021098947 A1 * | 5/2021 | | H04L 9/0819 |

OTHER PUBLICATIONS

Extended European Search Report in European Appln. No. 21965721.0, mailed on Aug. 13, 2025, 9 pages.

Lim et al., "The Error Tolerance Bound for Secure Multi-Qubit QKD Against Incoherent Attack," IEEE Journal of Selected Topics in Quantum Electronics, May 2015, 21(3):6600809, 9 pages.

* cited by examiner

METHOD AND APPARATUS FOR PERFORMING QUANTUM SECURE DIRECT COMMUNICATION BY USING HIGH-DIMENSIONAL QUANTUM STATE BASED ON POLARIZATION AND PHASE INFORMATION IN COMMUNICATION SYSTEM

CROSS-REFERENCE TO RELATED APPLICATIONS

This application is a National Stage application under 35 U.S.C. § 371 of International Application No. PCT/KR2021/017310, filed on Nov. 23, 2021. The disclosure of the prior application is incorporated by reference herein in its entirety.

TECHNICAL FIELD

The following description relates to a communication system and a method and device for performing quantum secure direct communication using a high-dimensional quantum state based on polarization and phase information.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure can provide a device and method for effectively performing communication using a quantum channel in a communication system.

The present disclosure can provide a device and method for effectively sending classic information using a quantum state in a communication system.

The present disclosure can provide a device and method for representing a plurality of bits per photon used for quantum communication in a communication system.

The present disclosure can provide a device and method for expressing information by combining the polarization and phase of photons used for quantum communication in a communication system.

The present disclosure can provide a device and method for performing high-dimensional quantum direct communication in a communication system.

The technical objects to be achieved in the present disclosure are not limited to the above-mentioned technical objects, and other technical objects that are not mentioned may be considered by those skilled in the art through the embodiments described below.

As an example of the present disclosure, a method performed by a first device in a communication system may comprise establishing a classic channel with a second device using a random access (RA) preamble and an RA response (RAR) message, receiving a forward pulse including photons in an initial quantum state from the second device, and transmitting a backward pulse representing a plurality of bits per photon by performing phase modulation and polarization modulation on the photons based on assistance of the classic channel.

As an example of the present disclosure, a method performed by a second device in a communication system may comprise establishing a classic channel with a first device using a random access (RA) preamble and an RA response (RAR) message, transmitting a forward pulse including photons in an initial quantum state from the first device, and receiving a backward pulse representing a plurality of bits per photon by performing phase modulation and polarization modulation on the photons based on assistance of the classic channel.

As an example of the present disclosure, a first device in a communication system may comprise a transceiver and a processor connected to the transceiver. The processor may establish a classic channel with a second device using a random access (RA) preamble and an RA response (RAR) message, receive a forward pulse including photons in an initial quantum state from the second device, and transmit a backward pulse representing a plurality of bits per photon by performing phase modulation and polarization modulation on the photons based on assistance of the classic channel.

As an example of the present disclosure, a second device in a communication system may comprise a transceiver and a processor connected to the transceiver. The processor may establish a classic channel with a first device using a random access (RA) preamble and an RA response (RAR) message, transmit a forward pulse including photons in an initial quantum state from the first device, and receive a backward pulse representing a plurality of bits per photon by performing phase modulation and polarization modulation on the photons based on assistance of the classic channel.

As an example of the present disclosure, a device may comprise at least one processor and at least one computer memory connected to the at least one processor and configured to store an instruction directing operations as executed by the at least one processor. The operations may comprise establishing a classic channel with a second device using a random access (RA) preamble and an RA response (RAR) message, receiving a forward pulse including photons in an initial quantum state from the second device and transmitting a backward pulse representing a plurality of bits per photon by performing phase modulation and polarization modulation on the photons based on assistance of the classic channel.

As an example of the present disclosure, a non-transitory computer-readable medium storing at least one instruction may comprise the at least one instruction executable by a processor. The at least one instruction may control a device to establish a classic channel with a second device using a random access (RA) preamble and an RA response (RAR) message, receive a forward pulse including photons in an initial quantum state from the second device and transmit a backward pulse representing a plurality of bits per photon by performing phase modulation and polarization modulation on the photons based on assistance of the classic channel.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

As is apparent from the above description, the embodiments of the present disclosure have the following effects.

According to the present disclosure, a data rate can be improved when performing quantum secure direct communication (QSDC).

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute anew embodiment. Reference numerals in each drawing may refer to structural elements.

DETAILED DESCRIPTION

Figure 1:
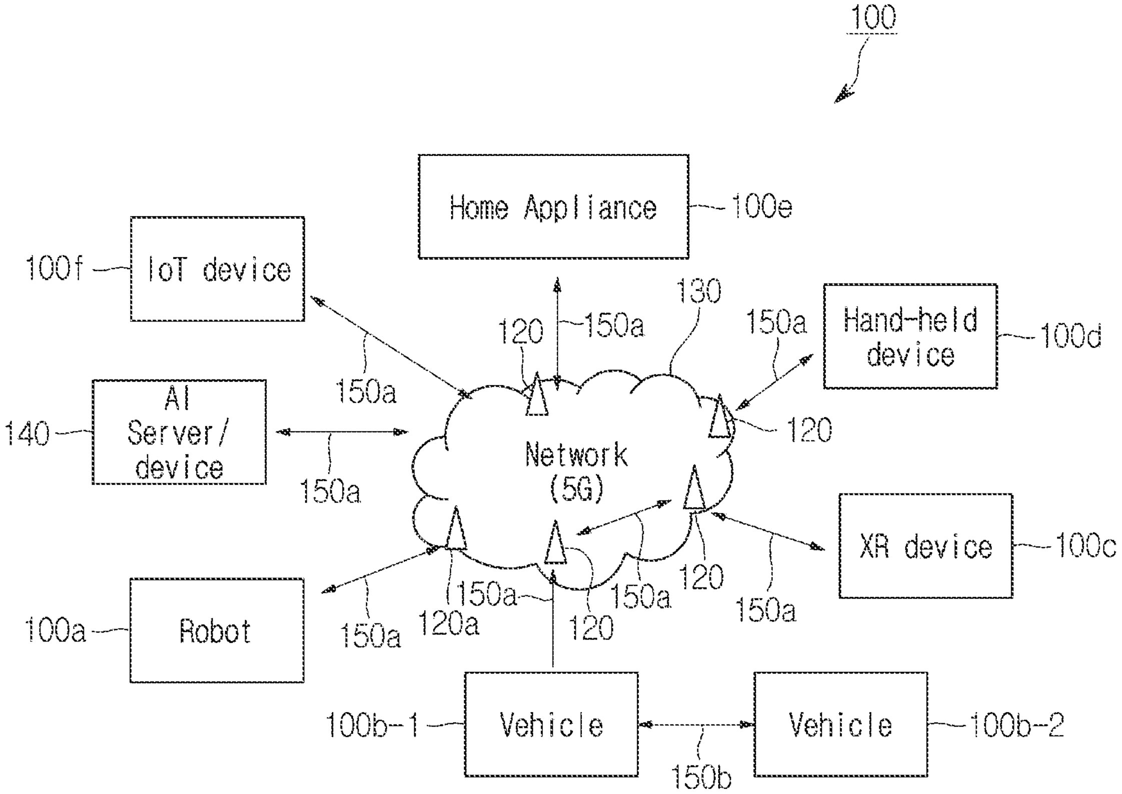
FIG. 1 illustrates an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3$^{rd}$ Generation Partnership Project (3GPP) system, a 3GPP Long Term Evolution (LTE) system, 3GPP 5$^{th}$ generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro, 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 illustrates an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120 and the network 130 may be implemented by a wireless device, and a specific wireless device 120*a* may operate as a base station/network node for another wireless device.

The wireless devices 100*a* to 100*f* may be connected to the network 130 through the base station 120. AI technology is applicable to the wireless devices 100*a* to 100*f*, and the wireless devices 100*a* to 100*f* may be connected to the AI server 100*g* through the network 130. The network 130 may be configured using a 3G network, a 4G (e.g., LTE) network or a 5G (e.g., NR) network, etc. The wireless devices 100*a* to 100*f* may communicate with each other through the base station 120/the network 130 or perform direct communication (e.g., sidelink communication) without through the base station 120/the network 130. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base station 120 and the base station 120/the base station 120. Here, wireless communication/connection may be established through various radio access technologies (e.g., 5G NR) such as uplink/downlink communication 150*a*, sidelink communication 150*b* (or D2D communication) or communication 150*c* between base stations (e.g., relay, integrated access backhaul (IAB). The wireless device and the base station/wireless device or the base station and the base station may transmit/receive radio signals to/from each other through wireless communication/connection 150*a*, 150*b* and 150*c*. For example, wireless communication/connection 150*a*, 150*b* and 150*c* may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
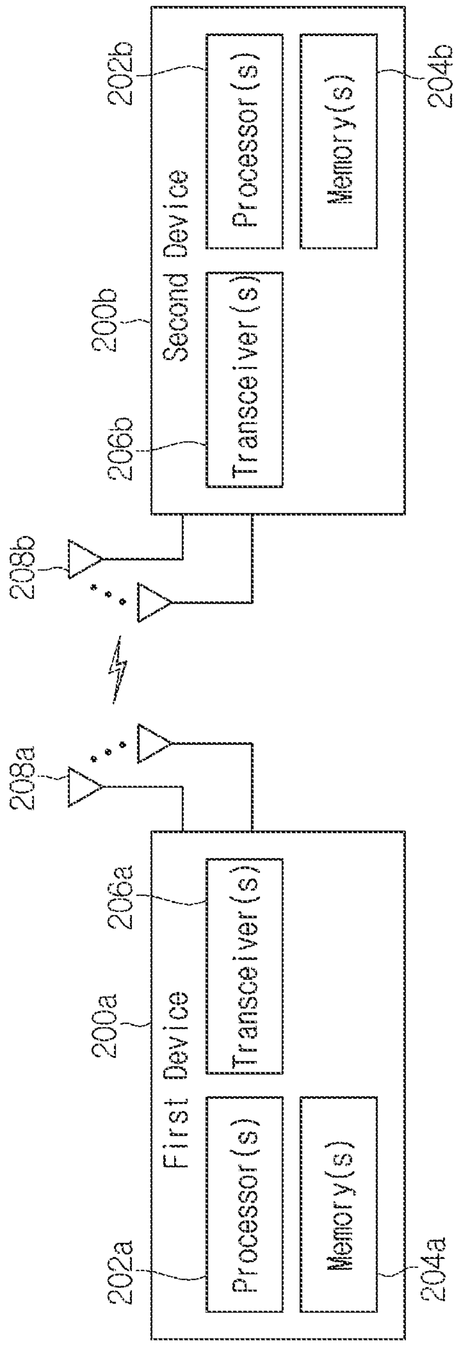
FIG. 2 illustrates an example of a wireless apparatus applicable to the present disclosure.

FIG. 2 illustrates an example of a wireless device applicable to the present disclosure.

Referring to FIG. 2, a first wireless device 200*a* and a second wireless device 200*b* may transmit and receive radio signals through various radio access technologies (e.g., LTE or NR). Here, {the first wireless device 200*a*, the second wireless device 200*b*} may correspond to {the wireless device 100*x*, the base station 120} and/or {the wireless device 100*x*, the wireless device 100*x*} of FIG. 1.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be coupled with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be coupled with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be coupled with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be coupled with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be coupled with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be coupled with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Structure of Wireless Device Applicable to the Present Disclosure

Figure 3:
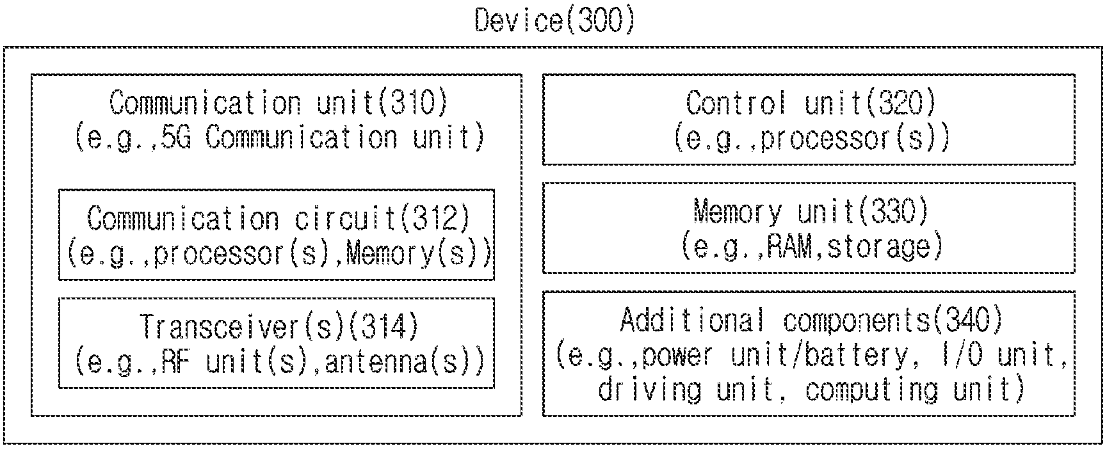
FIG. 3 illustrates another example of a wireless device applicable to the present disclosure.

FIG. 3 illustrates another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100*a*), the vehicles (FIG. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 100*f*), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 30) may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
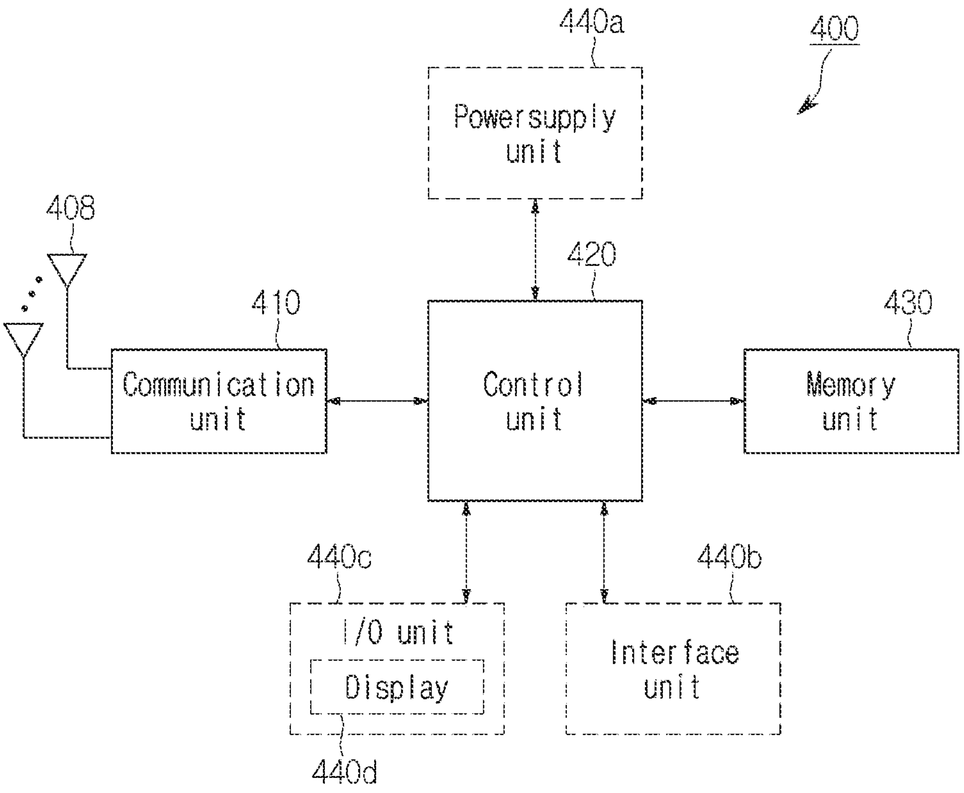
FIG. 4 illustrates an example of a hand-held device applicable to the present disclosure.

FIG. 4 illustrates an example of a hand-held device applicable to the present disclosure.

FIG. 4 illustrates a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Type of Wireless Device Applicable to the Present Disclosure

Figure 5:
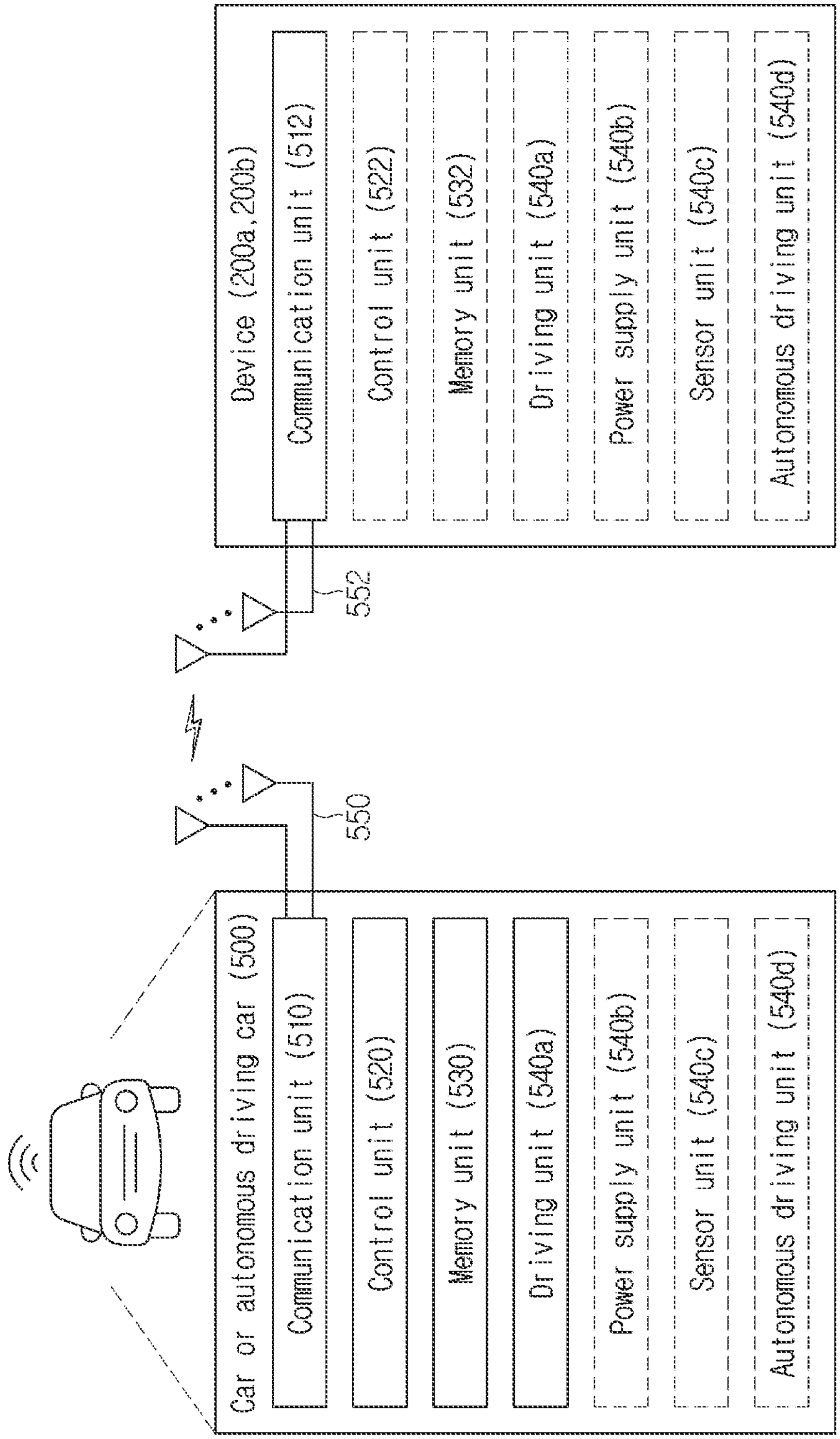
FIG. 5 illustrates an example of a car or an autonomous driving car applicable to the present disclosure.

FIG. 5 illustrates an example of a car or an autonomous driving car applicable to the present disclosure.

FIG. 5 illustrates a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
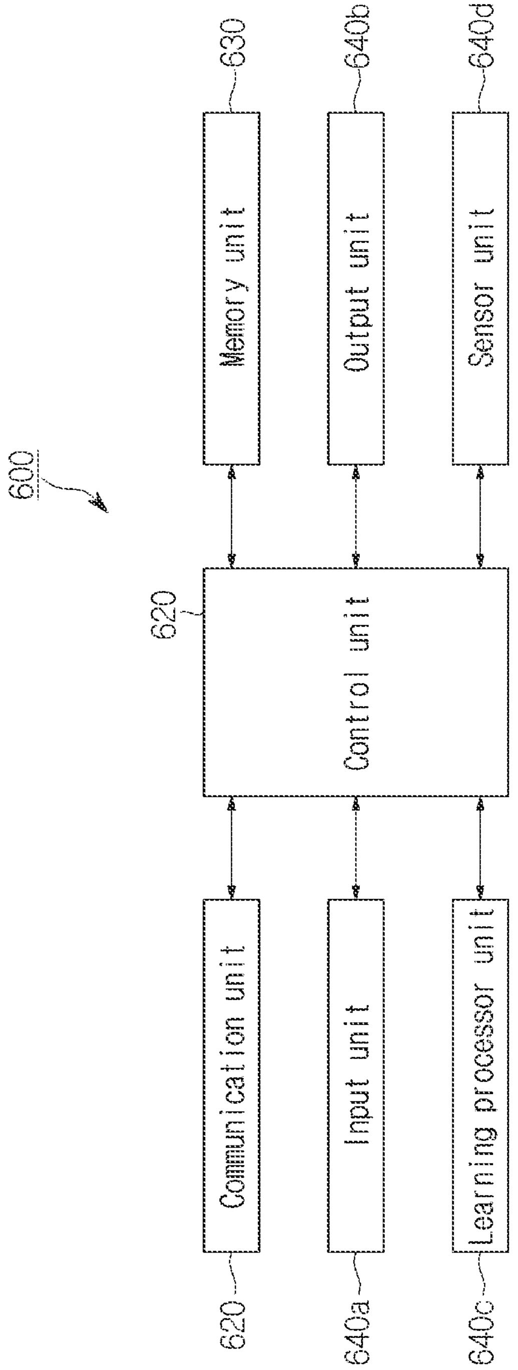
FIG. 6 illustrates an example of artificial intelligence (AI) device applicable to the present disclosure.

FIG. 6 illustrates an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 6, the AI device 600 may include a communication unit (transceiver) 610, a control unit (controller) 620, a memory unit (memory) 630, an input/output unit 640*a*/640*b*, a leaning processor unit (learning processor) 640*c* and a sensor unit 640*d*. The blocks 610 to 630/640*a* to 640*d* may correspond to the blocks 310 to 330/340 of FIG. 3, respectively.

The communication unit 610 may transmit and receive wired/wireless signals (e.g., sensor information, user input, learning models, control signals, etc.) to and from external devices such as another AI device (e.g., FIG. 1, 100*x*, 120 or 140) or the AI server (FIG. 1, 140) using wired/wireless communication technology. To this end, the communication unit 610 may transmit information in the memory unit 630 to an external device or transfer a signal received from the external device to the memory unit 630.

The control unit 620 may determine at least one executable operation of the AI device 600 based on information determined or generated using a data analysis algorithm or a machine learning algorithm. In addition, the control unit 620 may control the components of the AI device 600 to perform the determined operation. For example, the control unit 620 may request, search for, receive or utilize the data of the learning processor unit 640*c* or the memory unit 630, and control the components of the AI device 600 to perform predicted operation or operation, which is determined to be desirable, of at least one executable operation. In addition, the control unit 620 may collect history information including operation of the AI device 600 or user's feedback on the operation and store the history information in the memory unit 630 or the learning processor unit 640*c* or transmit the history information to the AI server (FIG. 1, 140). The collected history information may be used to update a learning model.

The memory unit 630 may store data supporting various functions of the AI device 600. For example, the memory unit 630 may store data obtained from the input unit 640*a*, data obtained from the communication unit 610, output data of the learning processor unit 640*c*, and data obtained from the sensing unit 640. In addition, the memory unit 630 may store control information and/or software code necessary to operate/execute the control unit 620.

The input unit 640*a* may acquire various types of data from the outside of the AI device 600. For example, the input unit 640*a* may acquire learning data for model learning, input data, to which the learning model will be applied, etc. The input unit 640*a* may include a camera, a microphone and/or a user input unit. The output unit 640*b* may generate video, audio or tactile output. The output unit 640*b* may include a display, a speaker and/or a haptic module. The sensing unit 640 may obtain at least one of internal information of the AI device 600, the surrounding environment information of the AI device 600 and user information using various sensors. The sensing unit 640 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 640*c* may train a model composed of an artificial neural network using training data. The learning processor unit 640*c* may perform AI processing along with the learning processor unit of the AI server (FIG. 1, 140). The learning processor unit 640*c* may process information received from an external device through the communication unit 610 and/or information stored in the memory unit 630. In addition, the output value of the learning processor unit 640*c* may be transmitted to the external device through the communication unit 610 and/or stored in the memory unit 630.

Figure 7:
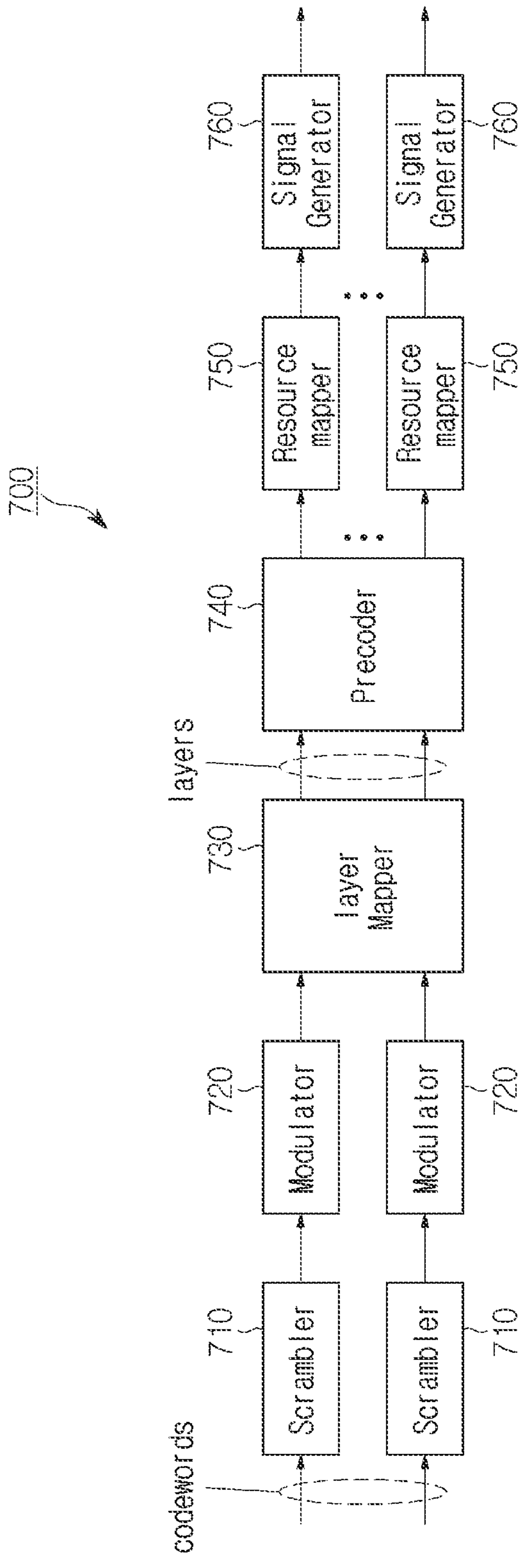
FIG. 7 illustrates physical channels applicable to the present disclosure and a signal transmission method using the same.

FIG. 7 illustrates a method of processing a transmitted signal applicable to the present disclosure. For example, the transmitted signal may be processed by a signal processing circuit. At this time, a signal processing circuit 700 may include a scrambler 710, a modulator 720, a layer mapper 730, a precoder 740, a resource mapper 750, and a signal generator 760. At this time, for example, the operation/function of FIG. 7 may be performed by the processors 202*a* and 202*b* and/or the transceiver 206*a* and 206*b* of FIG. 2. In addition, for example, the hardware element of FIG. 7 may be implemented in the processors 202*a* and 202*b* of FIG. 2 and/or the transceivers 206*a* and 206*b* of FIG. 2. For example, blocks 1010 to 1060 may be implemented in the processors 202*a* and 202*b* of FIG. 2. In addition, blocks 710 to 750 may be implemented in the processors 202*a* and 202*b* of FIG. 2 and a block 760 may be implemented in the transceivers 206*a* and 206*b* of FIG. 2, without being limited to the above-described embodiments.

A codeword may be converted into a radio signal through the signal processing circuit 700 of FIG. 7. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 710. The scramble sequence used for scramble is generated based in an initial value and the initial value may include ID information of a wireless device, etc. The scrambled bit sequence may be modulated into a modulated symbol sequence by the modulator 720. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 730. Modulation symbols of each transport layer may be mapped to corresponding antenna port(s) by the precoder 740 (precoding). The output z of the precoder 740 may be obtained by multiplying the output y of the layer mapper 730 by an N*M precoding matrix W. Here, N may be the number of antenna ports and M may be the number of transport layers. Here, the precoder 740 may perform precoding after transform precoding (e.g., discrete Fourier transform (DFT)) for complex modulation symbols. In addition, the precoder 740 may perform precoding without performing transform precoding.

The resource mapper 750 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 760 may generate a radio signal from the mapped modulation symbols, and the generated radio signal may be transmitted to another device through each antenna. To this end, the signal generator 760 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 710 to 760 of FIG. 7. For example, the wireless device (e.g., 200*a* or 200*b* of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as “intelligent connectivity”, “deep connectivity”, “holographic connectivity” and “ubiquitous connectivity”, and the 6G system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 8:
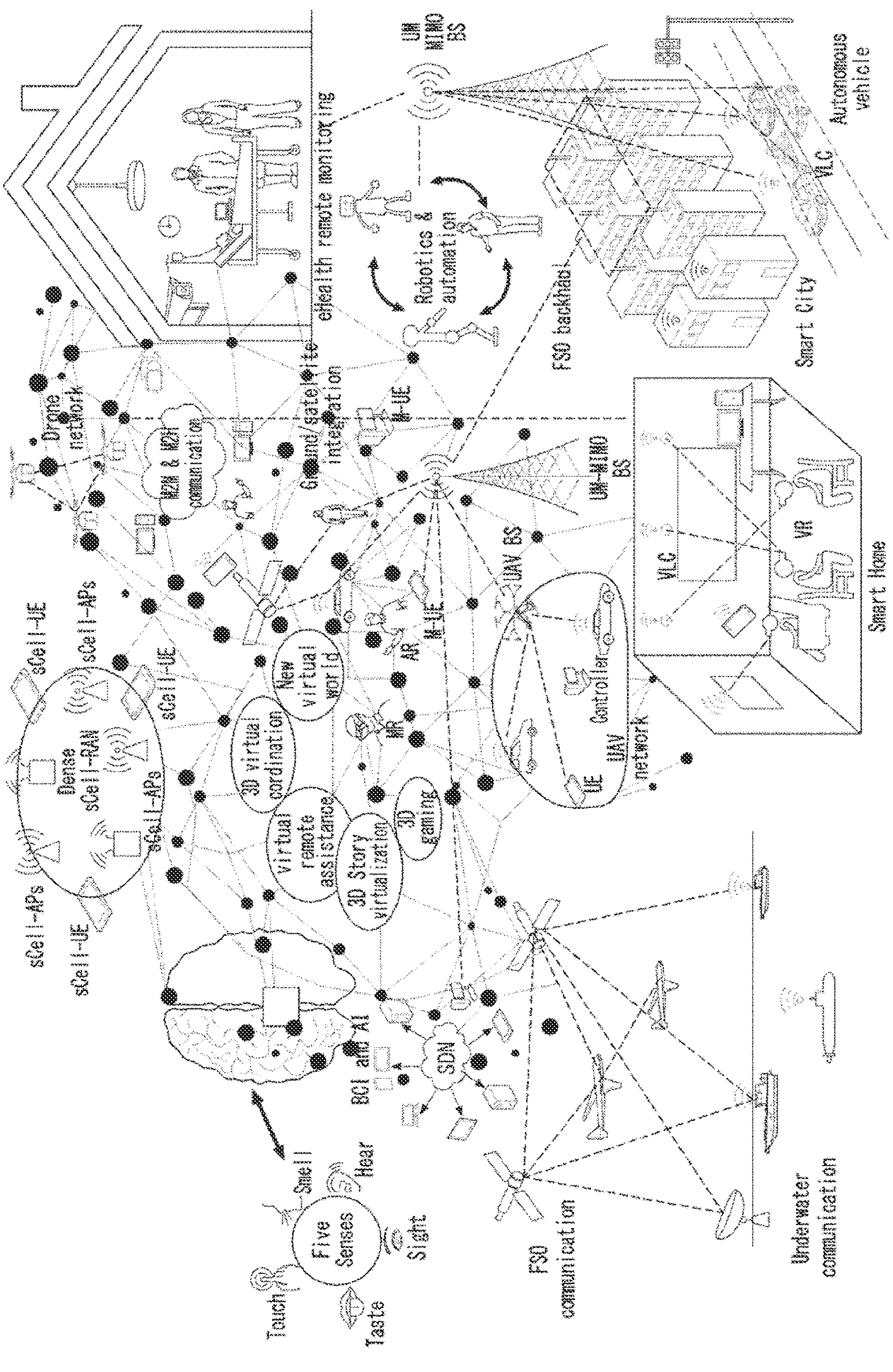
FIG. 8 illustrates an example of a communication structure providable in a 6th generation (6G) system applicable to the present disclosure.

FIG. 8 illustrates an example of a communication structure providable in a 6G system applicable to the present disclosure.

Referring to FIG. 8, the 6G system will have 50 times higher simultaneous wireless communication connectivity than a 50 wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

- Satellites integrated network: To provide a global mobile group, 6G will be integrated with satellite. Integrating terrestrial waves, satellites and public networks as one wireless communication system may be very important for 6G.
- Connected intelligence: Unlike the wireless communication systems of previous generations, 6G is innovative and wireless evolution may be updated from “connected things” to “connected intelligence”. AI may be applied in each step (or each signal processing procedure which will be described below) of a communication procedure.
- Seamless integration of wireless information and energy transfer: A 6G wireless network may transfer power in order to charge the batteries of devices such as smartphones and sensors. Therefore, wireless information and energy transfer (WIET) will be integrated.
- Ubiquitous super 3-dimension connectivity: Access to networks and core network functions of drones and very low earth orbit satellites will establish super 3D connection in 6G ubiquitous.

In the new network characteristics of 6G, several general requirements may be as follows.

- Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.
- Ultra-dense heterogeneous network: Ultra-dense heterogeneous networks will be another important characteristic of the 6G communication system. A multi-tier network composed of heterogeneous networks improves overall QoS and reduces costs.
- High-capacity backhaul: Backhaul connection is characterized by a high-capacity backhaul network in order to support high-capacity traffic. A high-speed optical fiber and free space optical (FSO) system may be a possible solution for this problem.
- Radar technology integrated with mobile technology: High-precision localization (or location-based service) through communication is one of the functions of the 6G wireless communication system. Accordingly, the radar system will be integrated with the 6G network.
- Softwarization and virtualization: Softwarization and virtualization are two important functions which are the bases of a design process in a 5 GB network in order to ensure flexibility, reconfigurability and programmability.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Figure 9:
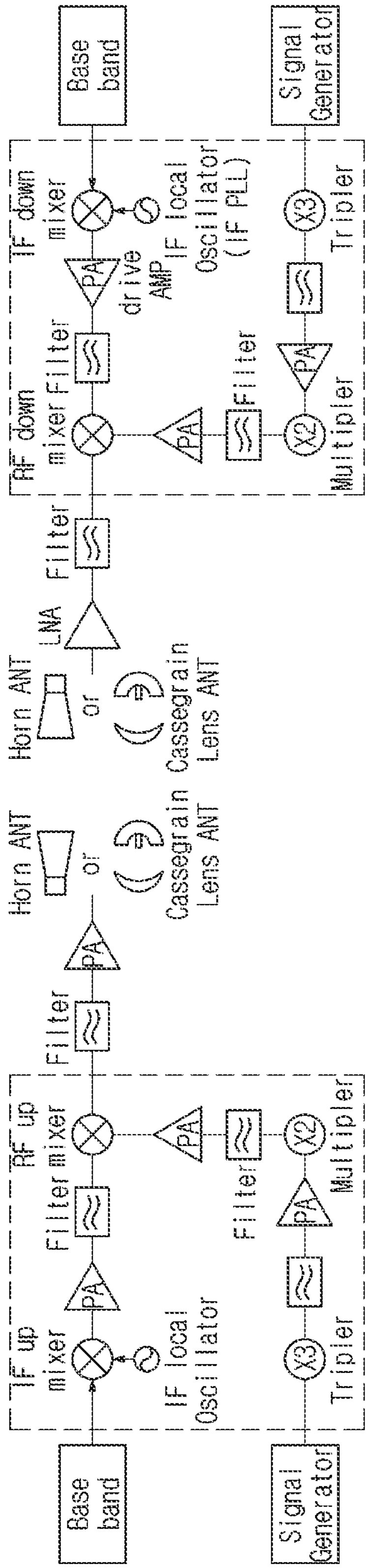
FIG. 9 illustrates a THz wireless communication transceiver applicable to the present disclosure.

FIG. 9 illustrates a THz wireless communication transceiver applicable to the present disclosure.

Referring to FIG. 9, THz wireless communication may be classified based on the method of generating and receiving THz. The THz generation method may be classified as an optical component or electronic component based technology.

At this time, the method of generating THz using an electronic component includes a method using a semiconductor component such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 9, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 9. In FIG. 9, IF represents an intermediate frequency, a tripler and a multiplier represents a multiplier, PA represents a power amplifier, and LNA represents a low noise amplifier, and PLL represents a phase-locked loop.

Figure 19:
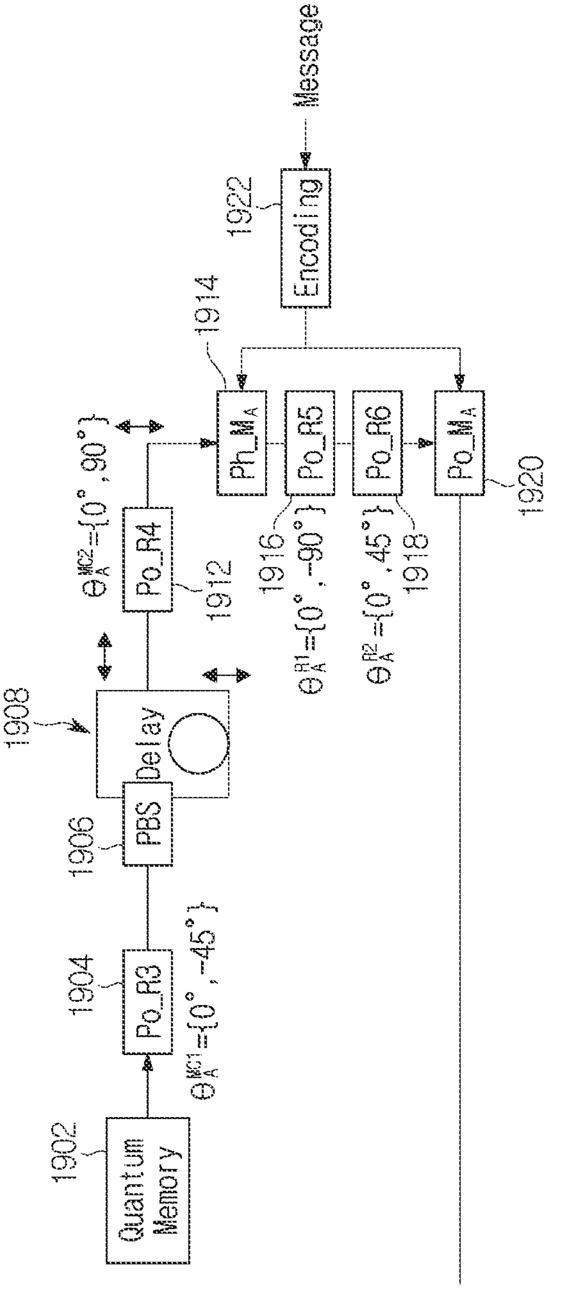
FIG. 19 illustrates an example of the configuration of a message encoding unit in a communication system according to an embodiment of the present disclosure.
Figure 20:
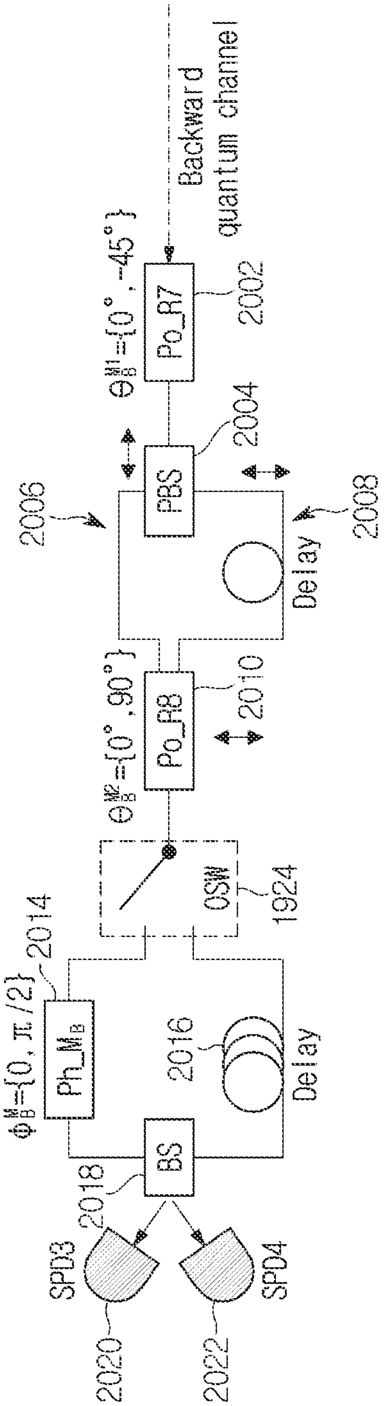
FIG. 20 illustrates an example of the configuration of a quantum state measurement unit in a communication system according to an embodiment of the present disclosure.

FIG. 19 illustrates a THz signal generation method applicable to the present disclosure. FIG. 20 illustrates a wireless communication transceiver applicable to the present disclosure.

Figure 10:
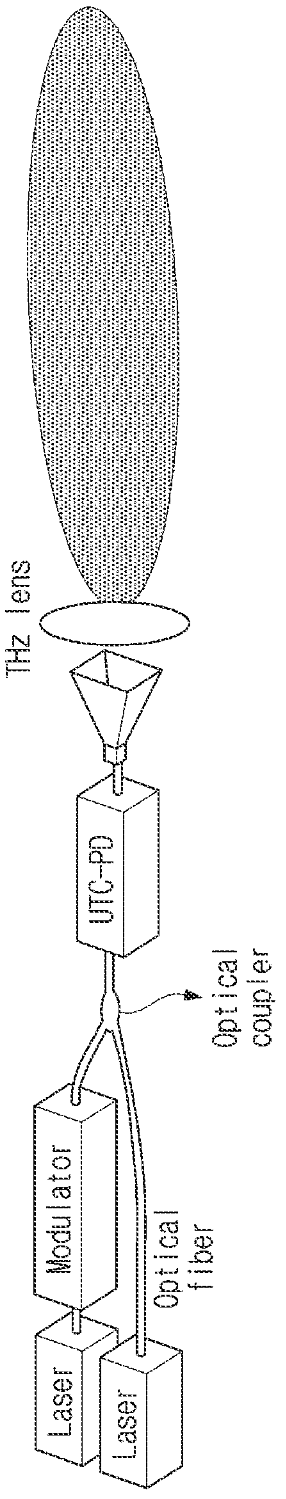
FIG. 10 illustrates a THz signal generation method applicable to the present disclosure.
Figure 11:
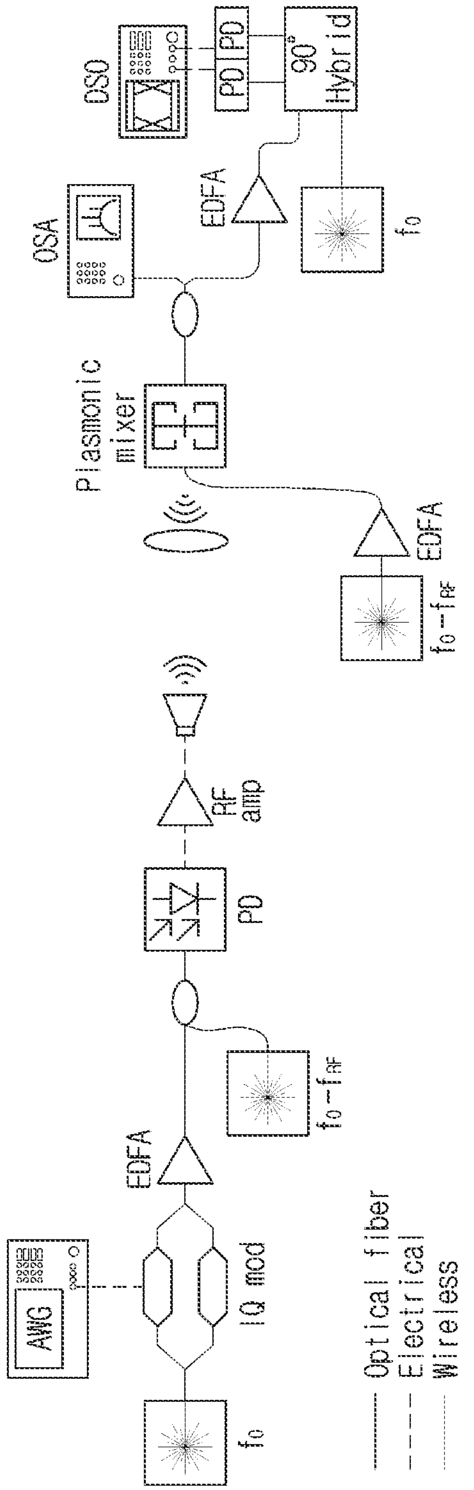
FIG. 11 illustrates a wireless communication transceiver applicable to the present disclosure.

Referring to FIGS. 10 and 11, the optical component-based THz wireless communication technology means a method of generating and modulating a THz signal using an optical component. The optical component-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic component, can generate a high-power signal, and can obtain a flat response characteristic in a wide frequency band. In order to generate the THz signal based on the optical component, as shown in FIG. 10, a laser diode, a broadband optical modulator, and an ultrahigh-speed photodetector are required. In the case of FIG. 10, the light signals of two lasers having different wavelengths are combined to generate a THz signal corresponding to a wavelength difference between the lasers. In FIG. 10, an optical coupler refers to a semiconductor component that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 11, an erbium-doped fiber amplifier (EDFA) represents an optical fiber amplifier to which erbium is added, a photo detector (PD) represents a semiconductor component capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 12:
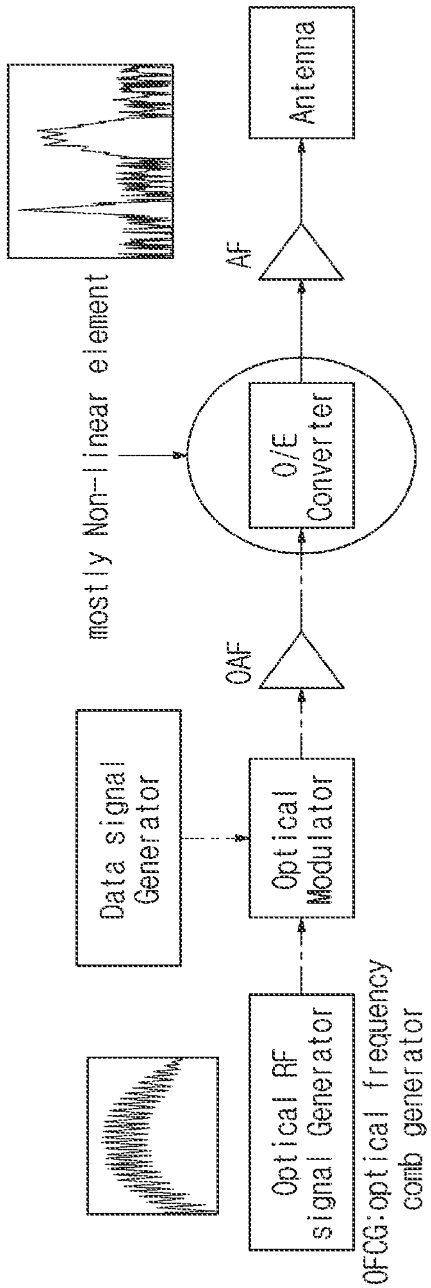
FIG. 12 illustrates a THz signal generation method applicable to the present disclosure.
Figure 13:
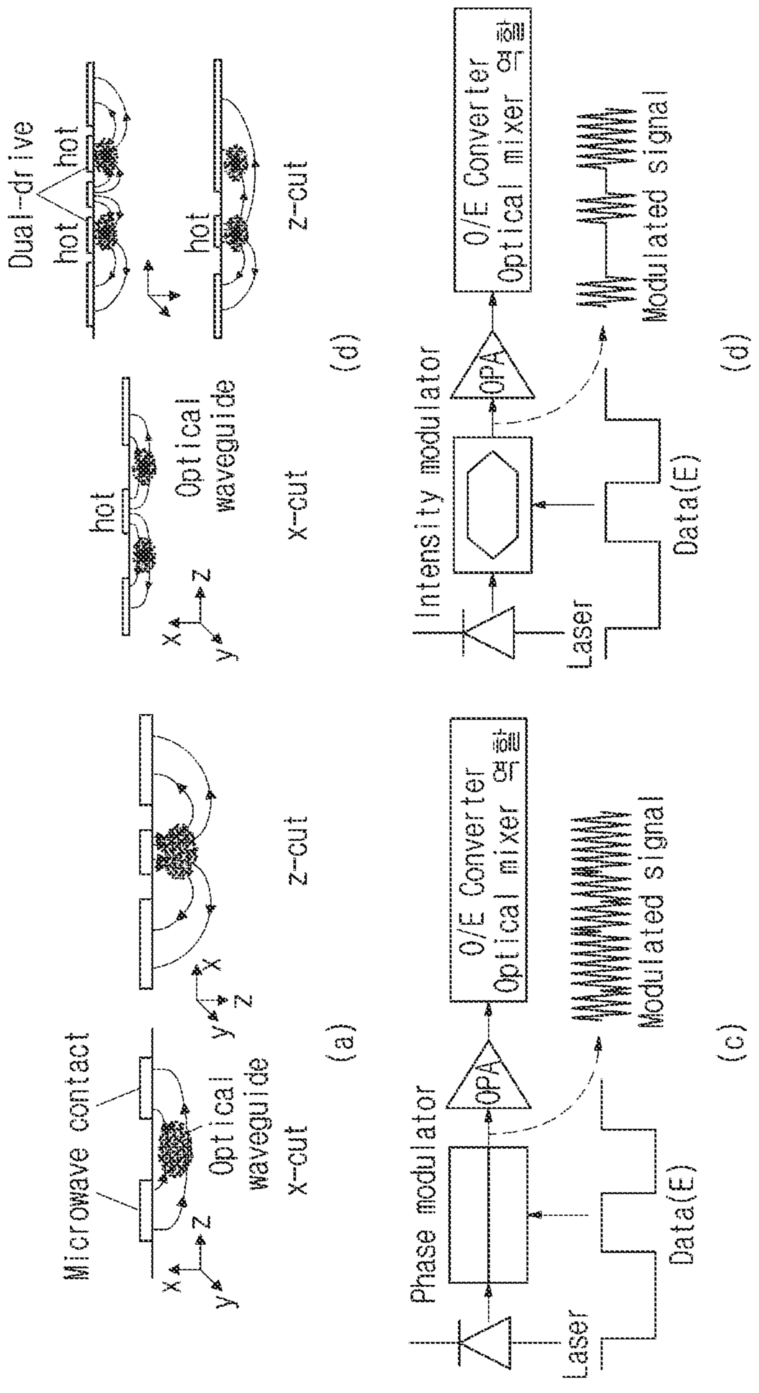
FIG. 13 illustrates a wireless communication transceiver applicable to the present disclosure.

FIG. 12 illustrates a transmitter structure applicable to the present disclosure. FIG. 13 illustrates a modulator structure applicable to the present disclosure.

Referring to FIGS. 12 and 13, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the component.

Given THz spectrum usage, multiple contiguous GHz bands are likely to be used as fixed or mobile service usage for the terahertz system. According to the outdoor scenario criteria, available bandwidth may be classified based on oxygen attenuation 10^dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Quantum Cryptography Communication

In a quantum cryptography communication system, unlike conventional communication methods that perform communication using wavelengths or amplitudes, signals are carried using a single photon, the smallest unit of light. While most conventional cryptographic systems are guaranteed stability by the complexity of mathematical algorithms, quantum cryptography communication is based on stability of non-cloning, which is the unique property of quantum and thus its stability is guaranteed as long as the physical laws of quantum mechanics are not broken. Quantum cryptography communication may be classified into quantum key distribution (QKD) technology, which generates an encryption key based on the properties of quantum, and quantum communication (QC) technology, which sends information using quantum.

According to quantum key distribution technology, two objects share the same quantum secret key information (e.g., symmetric key information) generated based on the characteristics of quantum mechanics (e.g., non-cloning, etc.), and stability may be ensured by transmitting and receiving ciphertext obtained by combining the quantum secret key and plaintext. The most representative quantum key distribution protocol is the BB84 protocol proposed by C. H. Bennett and G. Brassard in 1984. The BB84 protocol carries information on the state of photons, such as polarization and phase, and uses the characteristics of quantum to theoretically share secret keys absolutely safely.

a single photon. However, in the case of current quantum communication scheme, it is impossible to increase performance beyond the hardware limits of single photon-based quantum information due to hardware constraints such as dead time of a single photon detector (SPD). Here, dead time refers to a reset time it takes from detection of one signal to detection of the next signal. Therefore, it is difficult to use current quantum communication technology as a high-speed transmission scheme. [Table 2] shows dead time, which is a data rate constraint of commercial SPD hardware.

TABLE 2

| Detector type | Operation temperature[K] | Detection efficiency [%] | Dark count [Hz] | Dead time [ns] | jitter [ps] | Photon number resolving |
|---|---|---|---|---|---|---|
| PMT(visible) | 300 | 45@550 nm | 100 | — | 50 | impossible |
| PMT(IR) | 200 | 2@1,500 nm | 200,000 | — | 300 | impossible |
| Si SPAD | 263 | 80@800 nm | 200 | 50 | 400 | impossible |
| InGaAs SPAD | 250 | 25@1,500 nm | 50 | 1,000 | 150 | impossible |
| TES | 0.1 | 95@1,500 nm | — | ~1,000 | 100,000 | Possible |
| SNSPD | 2.7 | 85@1,500 nm | 300 | 30 | 25 | impossible |

Quantum communication mainly expresses information using the phase or polarization of photons. Quantum communication allows information to be safely transmitted through a quantum channel without encryption and decryption of the information using a secret key. In other words, when using quantum communication, two objects performing communication can secure the stability of quantum information without using a secret key. For example, quantum communication includes quantum secure direct communication (QSDC), quantum teleportation, etc.

Figure 14:
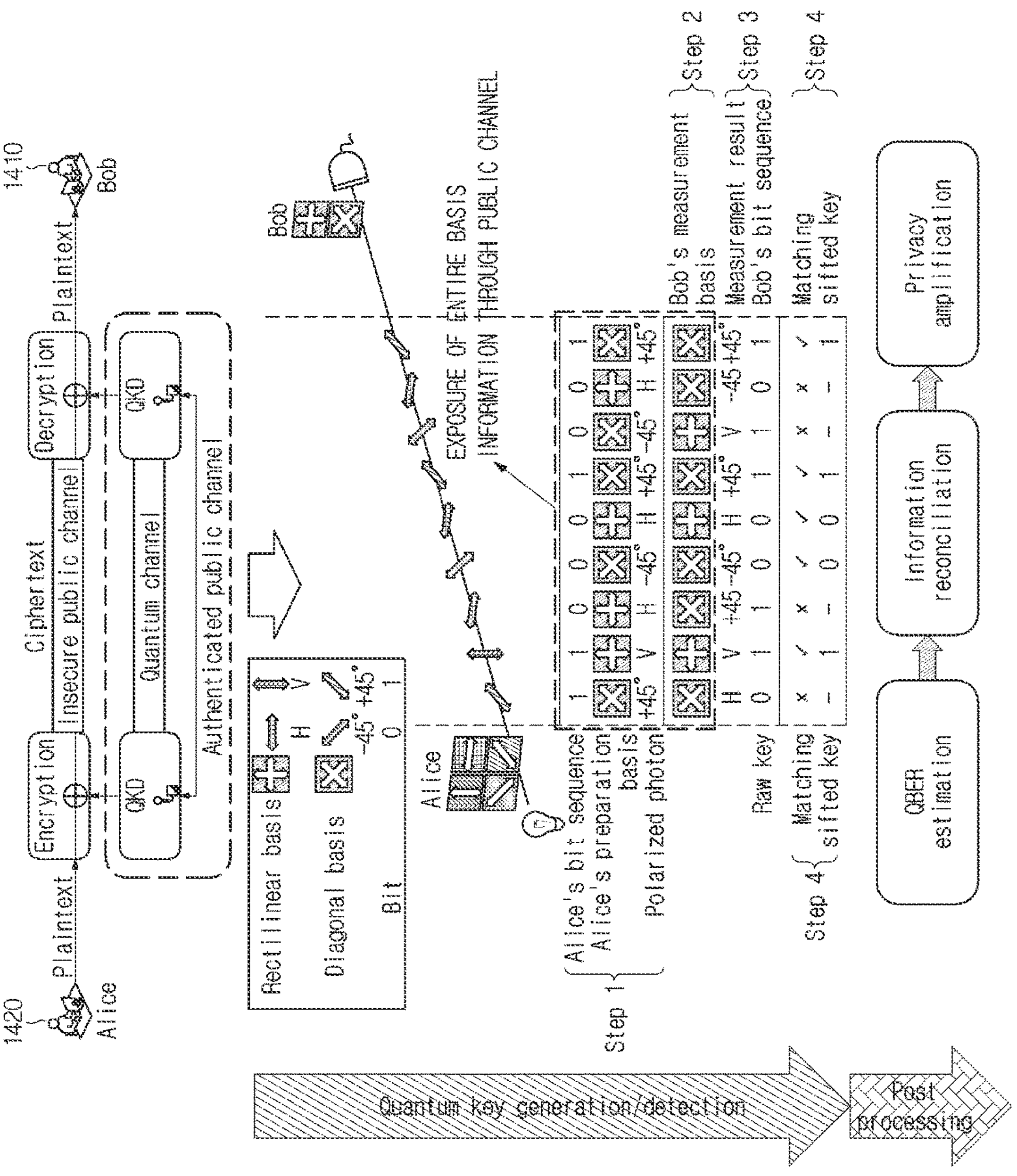
FIG. 14 illustrates a quantum key distribution (QKD) technology applicable to the present disclosure.

FIG. 14 illustrates a quantum key distribution technology applicable to the present disclosure. Referring to FIG. 14, a quantum key is generated between Bob 1410 and Alice 1420. Specifically, Bob 1410 transmits a quantum pulse using randomly selected bases, and Alice 1420 also transmits bits constituting a quantum key based on the randomly selected bases. Here, bits corresponding to the timing when Bob 1410 and Alice 1420 select the same basis may be used as a key value. For this purpose, information about the selected bases may be shared through classic or public channels.

Figure 15:
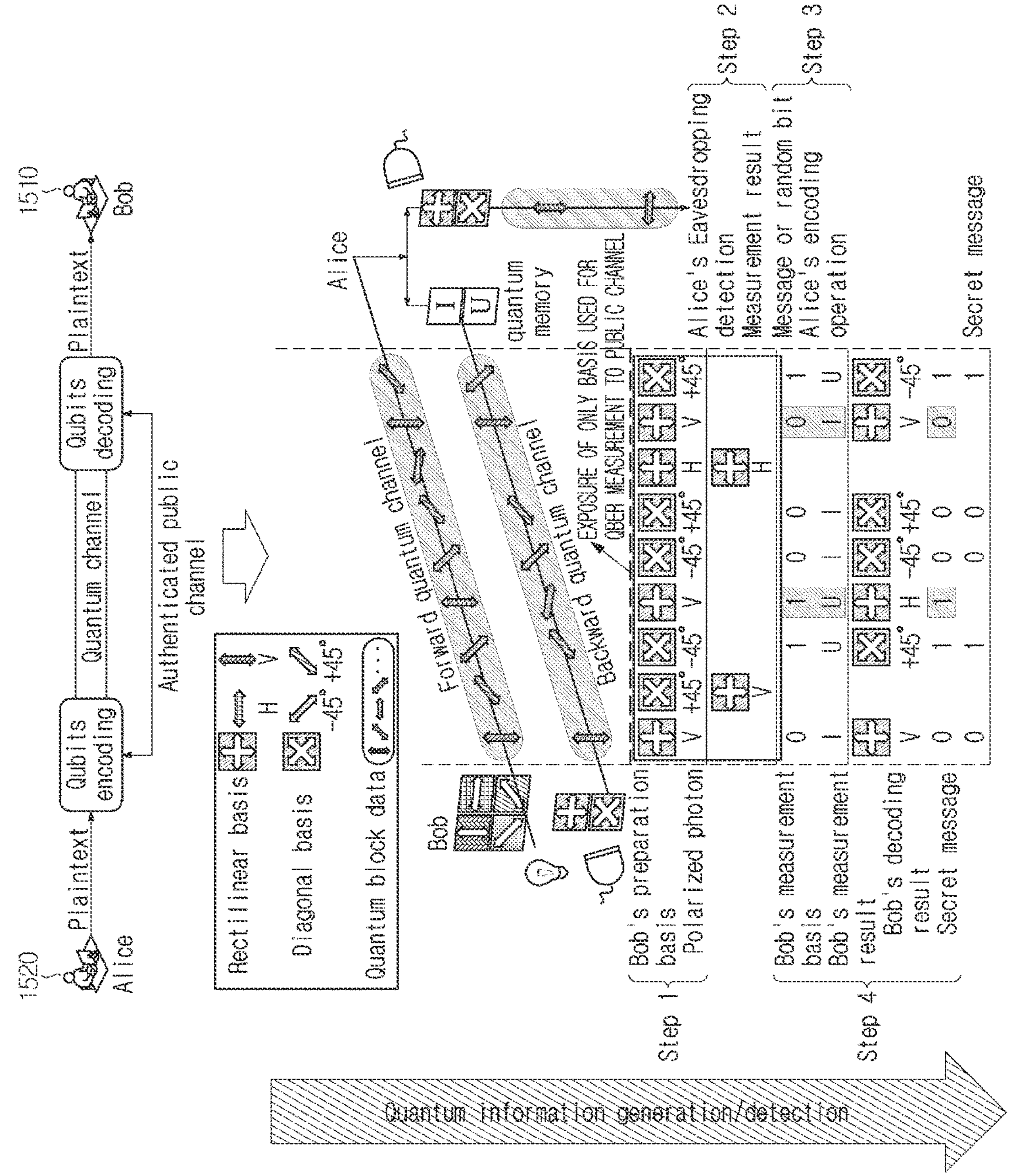
FIG. 15 illustrates a quantum secure direct communication (QSDC) technology applicable to the present disclosure.

FIG. 15 illustrates a quantum secure direct communication technology applicable to the present disclosure. Referring to FIG. 15, quantum information is directly transmitted and received through a quantum channel between Bob 1510 and Alice 1520. At this time, Bob 1510 and Alice 1520 may use a quantum channel to share quantum information and use a classic channel or a public channel to estimate an error rate. Additionally, quantum communication may be performed in multi-step to prevent the occurrence of leakage information.

Specific Embodiment of the Present Disclosure

The present disclosure is to send information through a quantum channel in a communication system. Specifically, the present disclosure relates to technology for increasing the efficiency of using quantum channels.

Quantum secure direct communication (QSDC) scheme enables transmission of 1 bit of classic information through a quantum channel through polarization or phase coding of Referring to [Table 2], since the dead time of the single photon detector is at least several tens of ns, the maximum data rate of a detection signal is only a few tens of Mbps at most. Therefore, in situations where hardware constraints exist, a protocol-based approach called high-dimensional quantum information transmission in terms of software is required. However, in implementing high-dimensional quantum information transmission, the following challenges exist.

When generating a quantum state that combines polarization coding and phase coding, accurate measurement may be difficult due to the polarization sensitivity of a phase modulator used in an interferometer when detecting phase signals. If the polarization information input when detecting phase information is not constant, and the polarization of the signal input to the phase modulator during the detection process is different for each optical signal, phase distortion occurs due to errors such as cross coupling of polarization, greatly reducing modulation accuracy. When generating high-dimensional quantum information through polarization and phase coding, at least four polarization states are used, so the polarization of the optical signal input to the phase modulator when detecting phase information may not be constant. Therefore, in order to accurately detect phase information, there is a need for a method of keeping the polarization of the optical signal incident on the phase modulator applied in the interferometer constant.

When an initial quantum state is generated using both polarization coding and phase coding and then combined by encoding classic message information into the initial quantum state, since the polarization is unified after phase coding, safety obtained from the randomness of the initial polarization may not be secured during polarization information coding. As described above, in order to ensure the accuracy of the phase modulator applied during phase coding, there is a need for a process of unifying the polarization component of the input optical signal into a single form. Because of this, all the various types of polarization components included in the quantum information initially generated by Bob may disappear. In the case of quantum communication, since the initial quantum state performs a similar role to the secret key of existing QKD, if the polarization of the initial quantum state is transformed to a unified value, the safety of transmitted information may not be guaranteed. Therefore, in order to ensure safety, a method is required to reconstruct the polarization state originally generated by Bob and then encode polarization information corresponding to the transmitted message into the reconstructed quantum state.

Therefore, the present disclosure proposes a quantum direct communication protocol that may transmit high-dimensional information of 2-bit/photon or more through a quantum state based on a combination of two degrees of freedom, such as polarization state and phase state. Specifically, the present disclosure presents a mapping rule for transmitting 2 or more bits of classic information through polarization and phase coding, and proposes technology in which a receiver may detect quantum state information expressed in polarization and phase all at once in an SPD through time difference information for each polarization state and interference of an interferometer after polarization matching of phase after transmission through a quantum channel.

In other words, the present disclosure proposes a new technology that approaches by applying a high-dimensional quantum information transmission protocol rather than a hardware approach to improve the data rate of the existing single-photon-based QSDC scheme. The proposed D-dimensional high-dimensional quantum transmission scheme is a scheme that transmits classic information of log 2D[bits] per photon. Hereinafter, the present disclosure describes various effective embodiments of generating and detecting high-dimensional quantum information through the combination of two different degrees of freedom, phase and polarization.

In implementing quantum communication or quantum cryptography communication, several degrees of freedom may be considered. For example, various schemes are being developed that use polarization, phase, time bin, orbital angular momentum (OAM), and slepian state as quantum states. Among these, the present disclosure describes various embodiments that improve data rates without improving hardware or using additional resources by expanding quantum direct communication technology to higher-dimensional information transmission technology by applying phase and polarization in combination.

Figure 16:
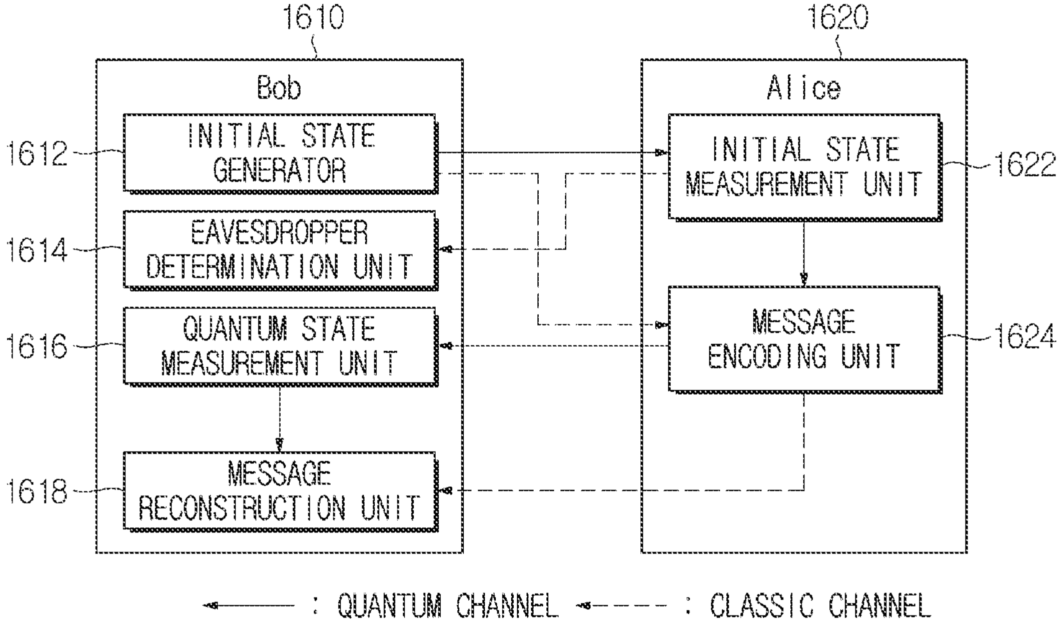
FIG. 16 illustrates an example of the functional configuration of devices that perform quantum secure direct communication in a communication system according to an embodiment of the present disclosure.

FIG. 16 illustrates an example of the functional configuration of devices that perform quantum secure direct communication in a communication system according to an embodiment of the present disclosure. FIG. 16 illustrates the functional configuration of a first device 1610 operating as Bob and a second device 1620 operating as Alice.

Referring to FIG. 16, the first device 1610 includes an initial state generator 1612, an eavesdropper determination unit 1614, a quantum state measurement unit 1616, and a message reconstruction unit 1618.

The initial state generator 1612 generates pulses including photons used to express information. Photons may have a predefined polarization state (e.g., 0°) upon initial generation and may be transmitted through a quantum channel in either a phase-modulated or polarization-modulated state. The phase and polarization state of photons output from the initial state generator 1612 are referred to as an ‘initial quantum state’.

The eavesdropper determination unit 1614 determines whether an eavesdropper is present based on the measurement result of the initial quantum state fed back from the second device 1620. That is, the eavesdropper determination unit 1614 may determine the error rate for quantum transmission by comparing the measurement result fed back from the second device 1620 and the initial state generated by the initial state generator 1612. At this time, if the error rate exceeds a threshold, the eavesdropper determination unit 1614 may determine that an eavesdropper is present. Upon determining that an eavesdropper is present, the eavesdropper determination unit 1614 or a control circuit (not shown) may perform control to suspend quantum communication between the first device 1610 and the second device 1620.

The quantum state measurement unit 1616 receives a quantum pulse generated according to the combination of the initial quantum state received from the second device 1620 and classic information, that is, a quantum pulse including photons of the encoded quantum state and measures the polarization state and phase state of the encoded quantum state. At this time, the quantum state measurement unit 1616 uses the basis used by the initial state generator 1612. The quantum state measurement unit 1616 determines classic information corresponding to the polarization state and phase state, and provides the determined classic information to the message reconstruction unit 1618.

The message reconstruction unit 1618 estimates the error rate and decodes the message based on the decoding parameter (e.g., error correction code parameter) corresponding to the estimated error rate. The first device 1610 may store classic information corresponding to the initially generated quantum state, compare the encoded quantum state with the bit value of the classic information obtained after measurement, and reconstruct the encoding result of the message transmitted from the second device 1620 based on the comparison result. However, due to the presence of errors that occur in the process of passing through the backward quantum channel, it may not be reconstructed to information that perfectly matches the codeword of the message generated by the second device 1620. Therefore, the message reconstruction unit 1618 may exchange information about the transmitted location (e.g., timing) for error rate (e.g., QBER) estimation through the classic channel, excluding the message transmitted from the second device 1620 and then estimate the error rate of the backward quantum channel by comparing the detection result and the information obtained through the classic channel. Based on the estimated error rate, the message reconstruction unit 1618 may determine decoding parameters to be used for decoding classic information and reconstruct the message by performing error correction based on the determined decoding parameters.

Referring to FIG. 16, the second device 1620 includes an initial state measurement unit 1622 and a message encoding unit 1624.

The initial state measurement unit 1622 checks whether the initial quantum state has been eavesdropped using a portion corresponding to a set ratio (e.g., 10%) of the photons with the initial quantum state that passed through the forward quantum channel. That is, the initial state measurement unit 1622 verifies the safety of initial information, which plays the most important role in ensuring the safety of quantum communication schemes. Specifically, the initial state measurement unit 1622 measures the transmitted initial quantum state by measuring the state (e.g., polarization and phase) of the quantum pulse received from the first device 1610. Then, the initial state measurement unit 1622 feeds back classic information (e.g., bit information) representing the measured initial quantum state to the first device 1610 through a classic channel. Accordingly, the first device 1610 may determine the error rate for quantum and determine whether an eavesdropper for quantum communication is present.

The message encoding unit 1624 encodes a message including classic information and performs polarization modulation and phase modulation on the quantum based on the encoded message, thereby generating a quantum pulse including classic information. Here, encoding includes channel coding for forward error correction (FEC). At this time, during the encoding process, dummy bits for estimating the error rate (e.g., QBER) for the quantum channel may be added. The dummy bit is a bit that has a shared value between the first device 1610 and the second device 1620 for error rate estimation, and may also be referred to as a 'reference bit.' Information about dummy bits may be predefined or transmitted to the message reconstruction unit 1618 through a classic channel. Among the photons in the initial quantum state received from the first device 1610, the remainder that is not used by the initial state measurement unit 1622 is provided to the message encoding unit 1624, and the message encoding unit 1624 expresses the encoded message using the remaining photons. At this time, the message encoding unit 1624 receives information about the basis used to generate the initial quantum state in the first device 1610, and reflects the encoded message to the quantum state using the information about the received basis. Then, the message encoding unit 1624 transmits a quantum pulse including the encoded message to the first device 1610.

As shown in FIG. 16, the devices 1610 and 1620 include components for quantum secure direct communication. That is, for convenience of explanation, in FIG. 16, the devices 1610 and 1620 are illustrated as consisting only of components for processing and transmitting or receiving quantum pulses, but may further include other components for operating within the communication system (e.g., a circuit for performing communication in a classic channel, a processor for calculation and control, a memory for storing data, a battery for supplying power, means for interfacing with the user, etc.).

Figure 17:
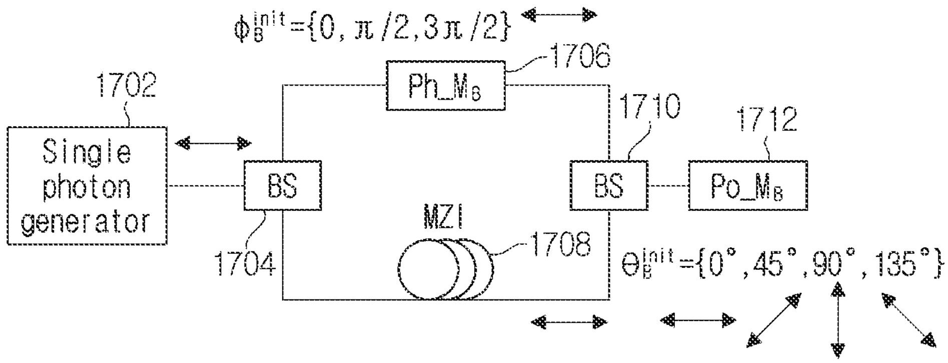
FIG. 17 illustrates an example of the configuration of an initial state generator in a communication system according to an embodiment of the present disclosure.

FIG. 17 illustrates an example of the configuration of an initial state generator in a communication system according to an embodiment of the present disclosure. Referring to FIG. 17, the initial state generator 1612 includes a single photon generator 1702, a beam splitter 1704, a phase modulator 1706, and a delay line 1708, a beam splitter 1710, and a polarization modulator 1712. FIG. 17 mainly illustrates components on a path along which the pulse moves. However, the device may further include a control circuit for controlling the operation of the illustrated components.

The single photon generator 1702 of the first device 1610 generates a single photon having a polarization state of 0°. The optical signal is branched into two signals (e.g., a first signal and a second signal) by the 50:50 beam splitter 1704, and the first signal of the branched signals passes a short path including the phase modulator 1706 and the second signal passes a long path including the delay line 1708. The phase modulator 1706 randomly selects one phase value from among four phase values of $$\Phi_B^{init} = \{O, \pi/2, \pi, 3\pi/2\}$$

and modulates the first signal passing the short path to have the selected phase value. The second signal that has passed the long path maintains an initial polarization state without phase change. After the first signal passes through a Mach-Zehnder interferometer (MZI), the second signal passes through the MZI at regular time intervals. The first signal and the second signal that has passed through the MZI are provided to the polarization modulator 1712 through the beam splitter 1710. The polarization modulator 1712 randomly selects one polarization value from among four polarization values of $$\theta_B^{init} = \{0°, 45°, 90°, 135°\}$$

and applies the selected polarization value to the signals. Mapping rules for classic bit information according to the phase and polarization values of the initial quantum state may be defined as shown in [Table 3] and [Table 4] below. The methods of generating 2D information, which may transmit 1 bit/photon of information, and 4D information, which may transmit 2 bit/photon of information, are as follows. [Table 3] illustrates a two-dimensional information mapping rule that supports 1 bit/photon, and [Table 4] illustrates a four-dimensional information mapping rule that supports 2 bit/photon.

TABLE 3

| basis | bit | Phase value $\Phi_B$ | Polarization value $\theta_B$ |
|---|---|---|---|
| A | 0 | 0 | 0° |
| | 1 | π | 90° |
| B | 0 | π/2 | 45° |
| | 1 | 3π/2 | 135° |

TABLE 4

| basis | bit | Phase value $\Phi_B$ | Polarization value $\theta_B$ |
|---|---|---|---|
| A | 00 | 0 | 0° |
| | 01 | 0 | 90° |
| | 10 | π | 0° |
| | 11 | π | 90° |
| B | 00 | π/2 | 45° |
| | 01 | π/2 | 135° |
| | 10 | 3π/2 | 45° |
| | 11 | 3π/2 | 135° |

Figure 18:
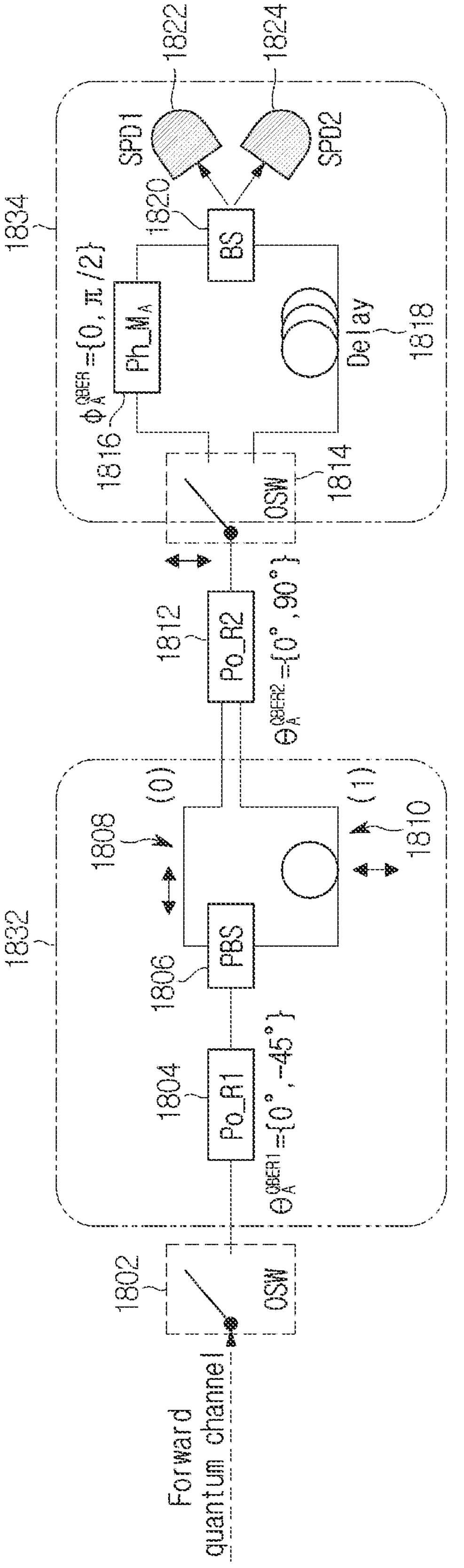
FIG. 18 illustrates an example of the configuration of a quantum bit error rate measurement unit in a communication system according to an embodiment of the present disclosure.

FIG. 18 illustrates an example of the configuration of an error rate measurement unit in a communication system according to an embodiment of the present disclosure. Referring to FIG. 18, the initial state measurement unit 1622 includes an optical switch (OSW) 1802, a first polarization rotator 1804, a polarized beam splitter 1806, a second polarization rotator 1812, an optical switch 1814, a phase modulator 1816, a delay line 1818, a beam splitter 1820, a first single photon detector 1822, and a second single photon detector Includes detector 1824. FIG. 18 mainly illustrates the components on a path along which the pulse moves. However, the device may further include a control circuit for controlling the operation of the illustrated components.

The optical switch 1802 randomly selects an initial quantum state to be used for QBER estimation. Since the photons generated by Bob are separated into two signals with a time difference in the MZI, the two separated signals are set to be output from the optical switch 1802 to the same block of the initial state measurement unit 1622 or the message encoding unit 1624. This is because measurement of transmission information using phase interference is possible only when two signals are provided to the same block. In other words, a forward pulse includes a pair of photons that are branched from the same photon in the first device 1610 and then transmitted with a time difference, and photons used for QBER estimation may be selected in units of pair of photons.

The first polarization rotator 1804 randomizes a polarization basis for measuring polarization information of the signal input to the initial state measurement unit 1622. If the selected polarization is 0°, the A(+) basis is selected, and if the selected polarization is −45°, the B(×) basis is selected. Accordingly, the polarization rotator 1704 randomly selects one of the two polarization rotation values, and the signal is output in a polarization state of either 0° or 90° polarization depending on the selection result. The signal that has passed through the polarization rotator 1704 is incident on the polarization beam splitter 1806. The polarization beam splitter 1806 outputs a signal along a path corresponding to the polarization state of the input signal. For example, if the polarization state is 0°, the signal is output to the first path 1808 with a short length on the upper side. On the other hand, if the polarization state is 90°, the signal is output to the second path 1810 with a long length on the lower side. Based on the time difference that occurs when measuring in the two paths 1808 and 1810, it can be determined whether the information transmitted through polarization is 0 or 1. For example, the signal that has passed through the first path 1808 has an output value of 0, and the signal that has passed through the second path 1810 has an output value of 1. That is, the first polarization rotator 1804, the polarization beam splitter 1806, the first path 1808, and the second path 1810 may be understood as a set of components for measuring polarization information, and may be referred to as 'polarization information measurement unit 1832'.

In order to block phase errors when measuring phase information, it is required to keep the wavelength of the input optical signal constant. To this end, the second polarization rotator 1812 rotates horizontal polarization by 90° among the wavelengths having vertical and horizontal polarization, and bypasses the vertical polarization, thereby matching the polarization of all input signals to 90°. Because of this, phase errors may be eliminated. Signals that have passed through the second polarization rotator 1812 are divided into a front signal and a back signal according to time sequence. Since the front signal is a phase-coded signal in Bob, it is output by the optical switch 1814 to a long path including the delay line 1818. Since the rear signal is a signal that has not been phase-coded in Bob, it is output to the phase modulator 1816. The phase modulator 1816 applies one of the two phase values of $$\Phi_A^{QBER} = \{0, \pi/2\}$$

to the input signal. Signals that have passed through each of the delay line 1818 and the phase modulator 1816 cause interference at the beam splitter 1820. Based on whether measurement is made at the first single photon detector 1822 or the second single photon detector 1824 and at what point in time detection is performed, phase and polarization information may be measured and classic information encoded in Bob may be detected. The optical switch 1814, the phase modulator 1816, the delay line 1818, the beam splitter 1820, the first single photon detector 1822, and the second single photon detector 1824 may be understood as a set of components for measuring phase information and may be referred to as the 'phase information measurement unit 1834'.

If the location, the basis, and the measurement value detected by Alice are informed to Bob through the classic channel, Bob may compare the basis and measurement value at the same location based on the received information and estimate the QBER. For example, QBER may be estimated by dividing "the total number of information with different measurement values among information measured by the same basis as Alice in Bob" by "the total number of information measured by the same basis as Alice in Bob". If QBER is above a threshold ratio (e.g., 11%), an eavesdropper may be treated as being present in the forward quantum channel, in which case Bob and Alice may suspend the process.

FIG. 19 illustrates an example of the configuration of a message encoding unit in a communication system according to an embodiment of the present disclosure. Referring to FIG. 19, the message encoding unit 1624 includes a quantum memory 1902, a third polarization rotator 1904, a polarization beam splitter 1906, a fourth polarization rotator 1912, and a phase modulator 1914, a fifth polarization rotator 1916, a sixth polarization rotator 1918, a polarization modulator 1922, and an encoding unit 1922. FIG. 19 mainly illustrates components on the path along which the pulse moves. However, the device may further include a control circuit for controlling the operation of the illustrated components.

The quantum memory 1902 stores the initial quantum state of the signal received from Bob. The quantum state is stored in the quantum memory 1902 during the QBER estimation process to check whether an eavesdropper is present.

The third polarization rotator 1904, the polarization beam splitter 1906, the fourth polarization rotator 1912, and the phase modulator 1914 are a set of components for encoding phase information corresponding to a message to be transmitted by Alice. During phase modulation, the polarization state of the input signal must be maintained in a uniform state to ensure phase modulation accuracy without phase error due to changes in polarization. Accordingly, the third polarization rotator 1904 rotates the polarization state of the input signal according to the basis of the initial state. Specifically, the third polarization rotator 1904 reduces the four polarization states into two polarization states (e.g., 0° and 90°) through polarization state rotation of 0° for basis A and −45° for basis B. Here, information about the basis of the initial state may be obtained through a classic channel.

The polarization beam splitter 1906 outputs signals through the first path 1908 and the second path 1910 according to the polarization state. By outputting two polarization states through paths 1980 and 1910 with different lengths by the polarization beam splitter 1906, the polarization states may be distinguished based on the difference in passage time for each polarization state. The fourth polarization rotator 1912 changes the input signal with a polarization state of 0° to a polarization state of 90°, thereby matching the polarization of all signals incident on the phase modulator 1914 to 90°. Accordingly, the occurrence of errors during phase coding can be suppressed. In other words, the fourth polarization rotator 1912 removes the phase coding error by matching the polarization information of the signals. The phase modulator 1914 encodes at least one bit to be expressed through phase coding in the transmission message for the signal output from the fourth polarization rotator 1912. At this time, the phase modulator 1914 may perform phase coding only on the front signal among the front and back signals transmitted from Bob to Alice, and may not perform phase coding on the back signal.

The fifth polarization rotator 1916, the sixth polarization rotator 1918, the polarization modulator 1920, and the encoding unit 1922 are a set of components for encoding polarization information corresponding to the message to be transmitted by Alice. Polarization encoding is performed by reconstructing polarization information that has been unified into a single polarization state for phase encoding to the state at the time of transmission, and encoding classic information to be transmitted in the reconstructed polarization information. The fifth polarization rotator 1916 and the sixth polarization rotator 1918 reconstruct the polarization state of the initial quantum state. Through this, the unified polarization information is reconstructed to the original four polarization states, that is, the polarization states stored in the quantum memory 1902. Among the polarization components that have passed through the polarization beam splitter 1906, the signal with a polarization of 0° arrives at the fifth polarization rotator 1916 before the signal with a polarization of 90°, so the fifth polarization rotator 1916 maintains the polarization state of 90° by giving a polarization shift of −90° to a signal arriving first (e.g., a signal arriving at time $t_1$) to reconstruct it to 0° and by not giving a polarization shift to a signal arriving later (e.g., a signal arriving at time $t_2$). In the next process, the polarization state is reconstructed based on the basis information received from Bob at the beginning of message coding. Specifically, the sixth polarization rotator 1918 does not provide a polarization change to the signal to which the A basis is applied, but provides a polarization change of 45° to the signal to which the B basis is applied, thereby reconstructing the polarization state of the initial quantum state. The polarization modulator 1920 encodes classic message information to be transmitted into the initial quantum state by rotating polarization according to the message information to be transmitted. That is, the polarization modulator 1920 encodes at least one bit to be expressed through polarization coding in the transmission message for the signal output from the sixth polarization rotator 1918. The encoding unit 1922 encodes a message sends at least one bit to be expressed through phase coding among the bits included in the encoded transmission message, that is, a codeword, to the phase modulator 1914 and provides at least one bit to be expressed through polarization coding to the polarization modulator 1920.

An example of quantum states stored in the quantum memory 1902 is shown in [Table 5] below.

TABLE 5

| Initial state | | Phase information | Polarization information |
|---|---|---|---|
| basis | bit | Phase value $\Phi_B$ | Polarization value $\theta_B$ |
| A | 00 | 0 | 0°(→) |
| | 01 | 0 | 90°(↑) |
| | 10 | π | 0°(→) |
| | 11 | π | 90°(↑) |
| B | 00 | π/2 | 45°(↗) |
| | 01 | π/2 | 135°(↖) |
| | 10 | 3π/2 | 45°(↗) |
| | 11 | 3π/2 | 135°(↖) |

An example of quantum states polarization-rotated b, the third polarization rotator 1904 is shown in [Table 6] below.

TABLE 6

| Initial state | | Phase information | Polarization information |
|---|---|---|---|
| basis | bit | Phase value $\Phi_B$ | Polarization value $\theta_B$ |
| A | 00 | 0 | 0°(→) |
| | 01 | 0 | 90°(↑) |
| | 10 | π | 0°(→) |
| | 11 | π | 90°(↑) |
| B | 00 | π/2 | 90°(↑) |
| | 01 | π/2 | 0°(→) |
| | 10 | 3π/2 | 90°(↑) |
| | 11 | 3π/2 | 0°(→) |

An example of quantum states polarization-rotated by the third polarization rotator 1904 is shown in [Table 6] below.

TABLE 7

| Initial state | | Phase information | Polarization information |
|---|---|---|---|
| basis | bit | Phase value $\Phi_B$ | Polarization value $\theta_B$ |
| A | 00 | 0 | 90°(↑) |
| | 01 | 0 | 90°(↑) |
| | 10 | π | 90°(↑) |
| | 11 | π | 90°(↑) |
| B | 00 | π/2 | 90°(↑) |
| | 01 | π/2 | 90°(↑) |
| | 10 | 3π/2 | 90°(↑) |
| | 11 | 3π/2 | 90°(↑) |

When performing phase coding in the phase modulator 1914, the phase values given according to the basis and information values are shown in [Table 8] below.

TABLE 8

| Encoding state | | Phase information |
|---|---|---|
| basis | Transmission information | $Ph\_M_A$ |
| A | 00 | 0 |
| | 01 | 0 |
| | 10 | π |
| | 11 | π |
| B | 00 | π/2 |
| | 01 | π/2 |
| | 10 | 3π/2 |
| | 11 | 3π/2 |

An example of quantum states polarization-rotated by the fifth polarization rotator 1916 and the sixth polarization rotator 1918 is shown in [Table 9] below.

TABLE 9

| Polarization in encoded state reconstructed to initial state basis | Phase information $\Phi_B$ | Reconstructed initial polarization information $\theta_A$ | Polarization shift over time $t_1(-90°) < t_2(0°)$ | Polarization shift according to basis A(0°), B(45°) |
|---|---|---|---|---|
| A | 0 + $Ph\_M_A$ | 0° | $t_1(-90°)$ | A(0°) |
| | 0 + $Ph\_M_A$ | 90° | $t_2(0°)$ | A(0°) |
| | $\pi$ + $Ph\_M_A$ | 0° | $t_1(-90°)$ | A(0°) |
| | $\pi$ + $Ph\_M_A$ | 90° | $t_2(0°)$ | A(0°) |
| B | $\pi/2$ + $Ph\_M_A$ | 45° | $t_1(-90°)$ | B(45°) |
| | $\pi/2$ + $Ph\_M_A$ | 135° | $t_2(0°)$ | B(45°) |
| | $3\pi/2$ + $Ph\_M_A$ | 45° | $t_1(-90°)$ | B(45°) |
| | $3\pi/2$ + $Ph\_M_A$ | 135° | $t_2(0°)$ | B(45°) |

When performing polarization coding in the polarization modulator 1920, the polarization values given according to the basis and information values are shown in [Table 10] below.

TABLE 10

| Encoding state | | Polarization information |
|---|---|---|
| basis | Transmission information | $Po\_M_A$ |
| A | 00 | 0° |
| | 01 | 90° |
| | 10 | 0° |
| | 11 | 90° |
| B | 00 | 45° |
| | 01 | 135° |
| | 10 | 45° |
| | 11 | 135° |

FIG. 20 illustrates an example of the configuration of a quantum state measurement unit in a communication system according to an embodiment of the present disclosure. Referring to FIG. 20, the quantum state measurement unit 1616 includes a seventh polarization rotator 2002, a polarization beam splitter 2004, an eighth polarization rotator 2010, an optical switch 2012, a phase modulator 2014, and a delay line 2016, a beam splitter 2018, a third single photon detector 2020, and a fourth single photon detector 2022. FIG. 20 mainly illustrates components on the path along which the pulse moves. However, the device may further include a control circuit for controlling the operation of the illustrated components.

The components of the quantum state measurement unit 1616 operate similarly to the components of the initial state measurement unit 1622, thereby measuring polarization and phase information of the signal received through the backward quantum channel. However, a difference from the initial state measuring unit 1622 is that, in selecting the basis of polarization information in the seventh polarization rotator 2002, the seventh polarization rotator 2002 follows the polarization basis information initially generated by Bob, without randomly selecting one of the two bases. That is, the polarization basis information initially generated by Bob is stored, and when the quantum state is returned through the backward quantum channel, by performing measurements with the same basis as the stored basis, it is possible to block loss of the encoded quantum state that occurs due to basis mismatch between transmitter and receiver due to randomly selected measurements. The signal passes through the polarization beam splitter 2004 and two paths 2006 and 2008 with different lengths to distinguish the polarization information by time difference. Then, the time difference caused by the two paths 2006 and 2008 causes a measurement time difference at the third single photon detector 2020 and the fourth single photon detector 2022. The measurement time difference is used to determine whether the information expressed in polarization is 0 or 1.

For accurate measurement of phase information, since the optical signal incident on the phase modulator 2014 must always have the same polarization state, the eighth polarization rotator 2010 rotates polarization such that all optical signals have the same polarization component of 90°. The optical switch 2012 outputs the phase-coded front signal from Alice through a long path including the delay line 2016, and outputs the phase-coded back signal through a short path including the phase modulator 2014. The phase modulator 2014 selects one of 0 and $\pi/2$ as a phase basis and performs phase modulation based on the selected phase basis. At this time, in order to prevent loss of the quantum state during the measurement process, the same phase basis as the basis information of the phase initially generated by Bob is used. In the beam splitter 2018, interference occurs between a signal that has passed through a short path and a signal that has passed through a long path. If the phase difference is 0, classic bit 0 is detected in the third single photon detector 2020, and if the phase difference is $\pi$, classical bit 1 is detected in the fourth single photon detector 2022. In conclusion, in the measurement of the encoded quantum state, phase information is obtained based on whether the measurement is made at the third single photon detector 2020 or the fourth single photon detector 2022, and polarization information is obtained based on the measured time difference.

Figure 21:
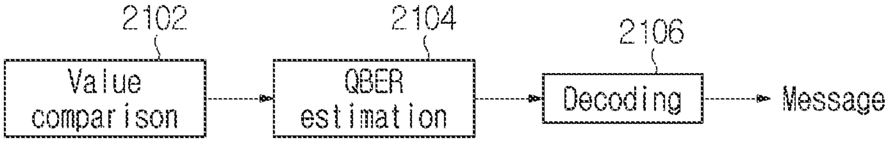
FIG. 21 illustrates an example of the configuration of a message reconstruction unit in a communication system according to an embodiment of the present disclosure.

FIG. 21 illustrates an example of the configuration of a message reconstruction unit in a communication system according to an embodiment of the present disclosure. Referring to FIG. 21, the message reconstruction unit 1618 includes a value comparison unit 2102, a QBER estimation unit 2104, and a decoding unit 2106. FIG. 21 mainly illustrates components on the path along which the pulse moves. However, the device may further include a control circuit for controlling the operation of the illustrated components.

The value comparison unit 2102 determines error bits among bit values determined from quantum states. Specifically, the value comparison unit 2102 may receive information about the transmission bit value corresponding to some of the bits determined from quantum states through a classic channel, and determine whether there is an error bit for each bit included in some bits based on the received information. Here, some of the bits are bits used for QBER estimation, and the positions (e.g., timing) of some of the bits may be predefined or determined through a separate procedure. At least one of the some bits may be a dummy bit, or may be a bit included in the message.

The QBER estimation unit 2104 estimates QBER based on the number of error bits. For example, the QBER estimator 2104 may check how many of the bits designated for QBER estimation are error bits and calculate a ratio occupied by the error bits. At this time, since the calculated ratio is a value in bit units, the QBER estimation unit 2104 may convert the calculated ratio into the photon domain.

The decoding unit 2106 reconstruct the message by decoding bits determined based on quantum states. To this end, the decoding unit 2106 determines at least one decoding parameter based on the estimated QBER and performs decoding based on the at least one determined decoding parameter. Here, at least one decoding parameter includes at least one parameter related to an error correction code, and decoding may include error correction.

Figure 22:
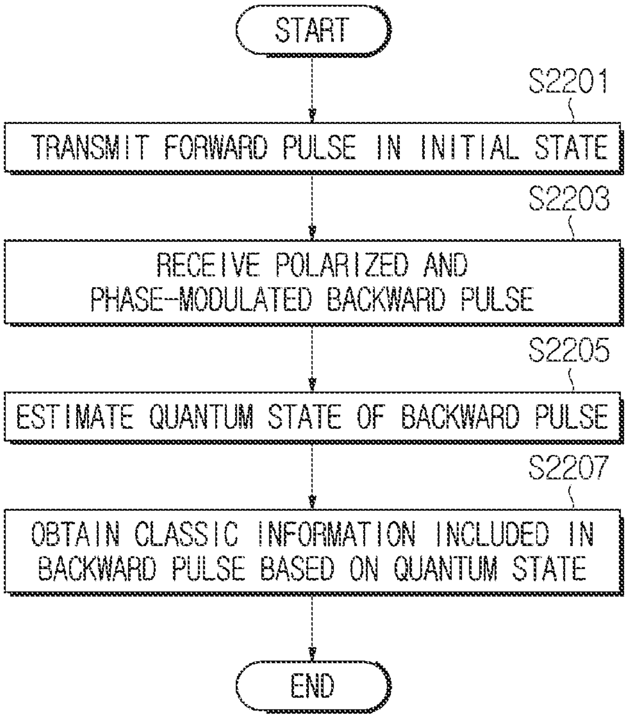
FIG. 22 illustrates an example of a procedure for receiving a quantum pulse including information in a communication system according to an embodiment of the present disclosure.

FIG. 22 illustrates an example of a procedure for receiving a quantum pulse including information in a communication system according to an embodiment of the present disclosure. FIG. 22 illustrates a method of operating a device (e.g., the first device 1610 of FIG. 16) operating as Bob in quantum communication. Here, the device is a device that may access a quantum channel and may be understood as one of a base station, a terminal, and a core network device.

Referring to FIG. 22, in step S2201, the device transmits a forward pulse in an initial state. The forward pulse contains photons that have an initial state or initial quantum state. For example, the initial state may include a polarization state and a phase state randomly selected by the device.

In step S2203, the device receives a polarized and phase-modulated backward pulse. That is, the device may receive a backward pulse to which both polarization modulation and phase modulation are applied through the quantum channel. Through a combination of polarization modulation and phase modulation, one photon may represent two or more bits. Although not shown in FIG. 22, for polarization modulation and phase modulation in a counterpart device (e.g., second device 1620 in FIG. 16), the device may transmit information related to a basis used to generate a forward pulse through a classic channel.

In step S2205, the device measures the quantum state of the backward pulse. Here, the quantum state is a quantum state that represents classic information and includes a combination of polarization state and phase state. At this time, the device may measure the quantum state of the backward pulse based on the initial state of the forward pulse. In other words, the device may measure the quantum state of the backward pulse using the same measurement basis as a generation basis used to generate the forward pulse.

In step S2207, the device obtains classic information included in the backward pulse based on the quantum state. The quantum state includes a combination of a polarization state and a phase state, and the combination of the polarization state and the phase state represents classic information. Accordingly, the device may obtain classic information from the quantum state measured according to the quantum state and the correspondence between bits. If classic information is channel-coded, the device may decode the bit string corresponding to the quantum state for error correction, determination of successful reception, etc.

Figure 23:
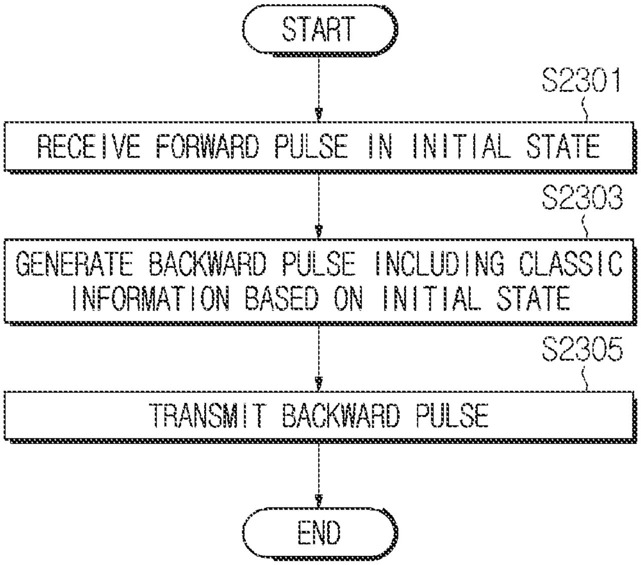
FIG. 23 illustrates an example of a procedure for transmitting a quantum pulse including information in a communication system according to an embodiment of the present disclosure.

FIG. 23 illustrates an example of a procedure for transmitting a quantum pulse including information in a communication system according to an embodiment of the present disclosure. FIG. 23 illustrates a method of operating a device (e.g., the second device 1620 of FIG. 16) operating as Alice in quantum communication. Here, the device is a device that may access a quantum channel and may be understood as one of a base station, a terminal, and a core network device.

Referring to FIG. 23, in step S2301, the device receives a forward pulse in an initial state. The forward pulse contains photons that have an initial state or initial quantum state. For example, the initial state may include a polarization state and a phase state randomly selected by a counterpart device (e.g., the first device 1610 in FIG. 16).

In step S2303, the device generates a backward pulse including classic information based on the initial state. For example, the device performs channel coding on a message containing classic information (e.g., a bit string) and expresses the channel-coded message using a quantum state. Here, the quantum state includes a combination of a polarization state and a phase state, and thus 2 bit/photon or more may be expressed. At this time, the device may use information related to the basis used to generate photons included in the forward pulse received through the classic channel from the counterpart device.

In step S2305, the device transmits a backward pulse. In other words, the device transmits backward pulses containing classic information through a quantum channel. According to one embodiment, the backward pulse includes classic information, that is, a message, and may further include at least one dummy bit for estimating an error rate for the quantum channel.

Figure 24:
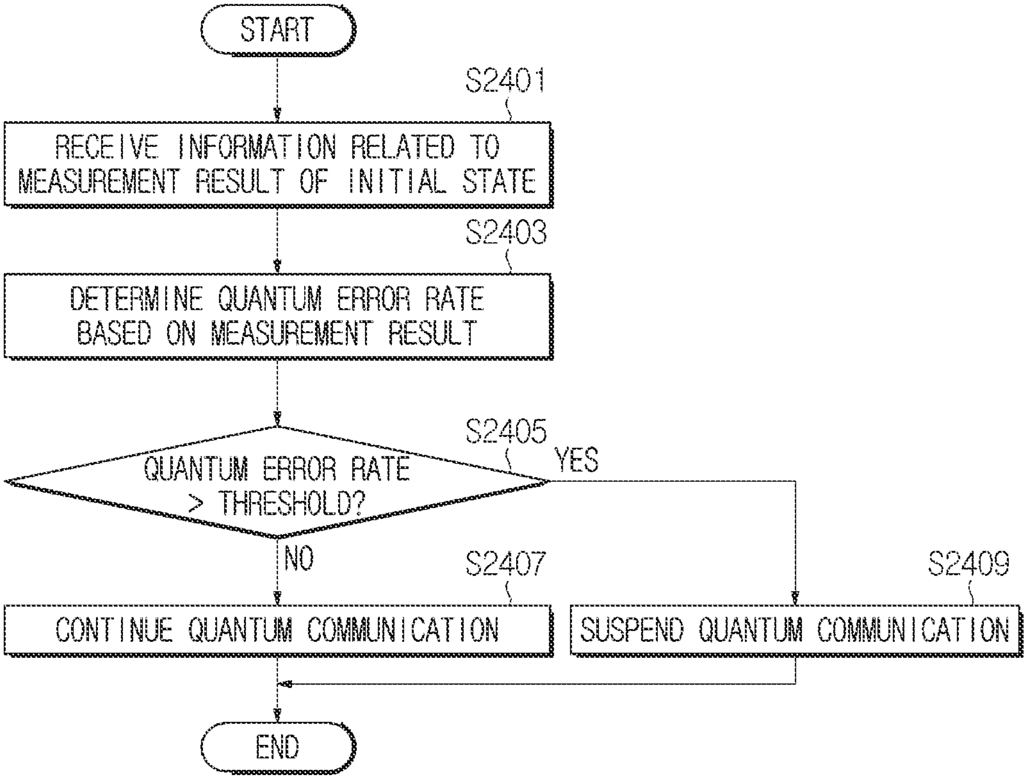
FIG. 24 illustrates an example of a procedure for performing quantum secure direct communication depending on whether eavesdropping is present in a communication system according to an embodiment of the present disclosure.

FIG. 24 illustrates an example of a procedure for performing quantum secure direct communication depending on whether eavesdropping is present in a communication system according to an embodiment of the present disclosure. FIG. 24 illustrates a method of operating a device (e.g., the first device 1610 of FIG. 16) operating as Bob in quantum communication. Here, the device is a device that may access a quantum channel and may be understood as one of a base station, a terminal, and a core network device.

Referring to FIG. 24, in step S2401, the device receives information related to the measurement result of the initial state. That is, the device transmits a forward pulse and then receives a measurement result about the initial state of photons included in the forward pulse. Here, the measurement result may be fed back through a classical channel.

In step S2403, the device determines the quantum error rate based on the measurement result. The quantum error rate refers to an error rate related to distortion of the quantum state that occurs in a quantum channel. Since the device knows the initial state of the photons included in the forward pulse, the quantum error rate may be calculated by comparing it with the fed-back measurement result.

In step S2405, the device determines whether the quantum error rate is greater than a threshold. That is, the device compares the determined quantum error rate with the threshold. Here, the threshold is predefined and is a value for determining whether or not eavesdropping is present. For example, the threshold may be 0.11.

If the quantum error rate is not greater than the threshold, the device continues quantum communication in step S2407. That is, if the quantum error rate is not greater than the threshold, the device determines that eavesdropping has not occurred and may continue to perform quantum communication.

On the other hand, if the quantum error rate is greater than the threshold, in step S2409, the device suspends quantum communication. That is, if the quantum error rate is greater than the threshold, the device may determine that eavesdropping has occurred and suspend quantum communication.

Figure 25:
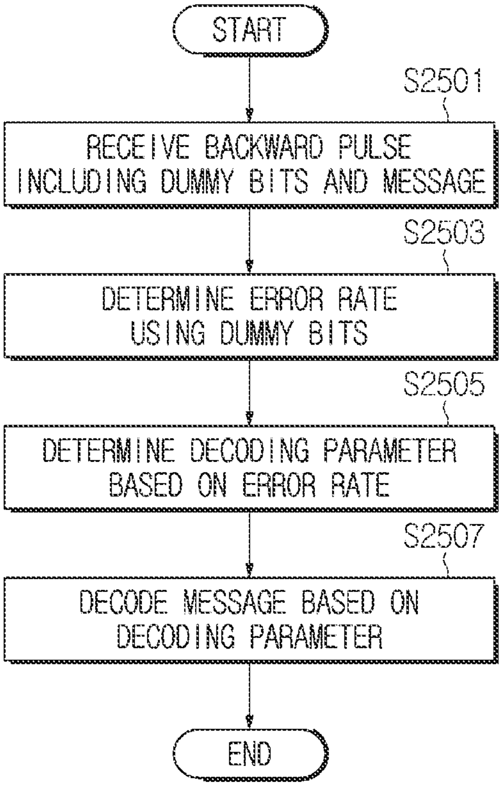
FIG. 25 illustrates an example of a procedure for decoding a message in a communication system according to an embodiment of the present disclosure.

FIG. 25 illustrates an example of a procedure for decoding a message in a communication system according to an embodiment of the present disclosure. FIG. 25 illustrates a method of operating a device (e.g., the first device 1610 of FIG. 16) operating as Bob in quantum communication. Here, the device is a device that may access a quantum channel and may be understood as one of a base station, a terminal, and a core network device.

Referring to FIG. 25, in step S2501, the device receives a backward pulse including dummy bits and a message. Here, the message includes data to be transmitted by the counterpart device (e.g., the second device 1620 in FIG. 16), and the dummy bits include bits with mutually shared values to determine the error rate.

In step S2503, the device determines an error rate using dummy bits. The device may measure the quantum state of photons included in the backward pulse and check bit values corresponding to the quantum state. Since the checked bit values include the bit values of dummy bits, the device may determine the error rate by comparing the bit values obtained through decoding and the transmitted bit values shared with the counterpart device. Here, the error rate may be determined in bit units or quantum units.

In step S2505, the device determines at least one decoding parameter based on the error rate. That is, the device may determine at least one parameter for decoding data included in the message based on the error rate determined using the dummy bits. For example, at least one parameter may be related to an error correction code.

In step S2507, the device decodes the message based on at least one decoding parameter. That is, the device obtains classic information (e.g., bit string) expressed by a backward pulse by measuring quantum states and performs channel decoding on the classic information. At this time, the device may perform error checking, error correction, etc. based on at least one decoding parameter determined based on the error rate.

Figure 26:
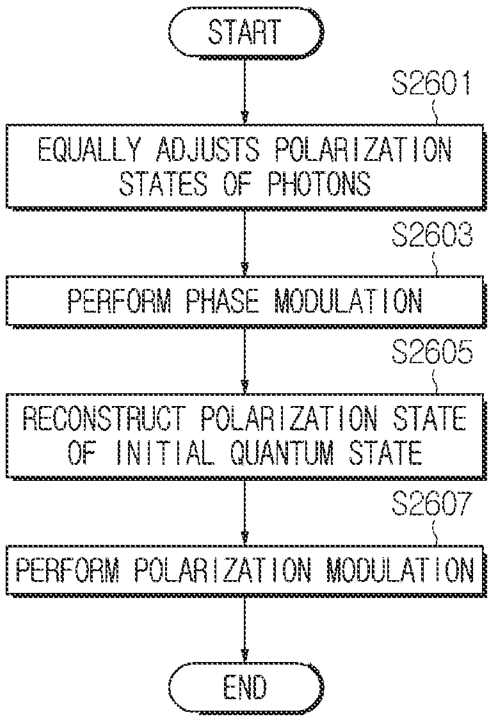
FIG. 26 illustrates an example of a procedure for encoding classic information using polarization and phase in a communication system according to an embodiment of the present disclosure.

FIG. 26 illustrates an example of a procedure for encoding classic information using polarization and phase in a communication system according to an embodiment of the present disclosure. FIG. 26 illustrates a method of operating a device (e.g., the second device 1620 of FIG. 16) operating as Alice in quantum communication. Here, the device is a device that may access a quantum channel and may be understood as one of a base station, a terminal, and a core network device.

Referring to FIG. 26, in step S2601, the device equally adjusts the polarization states of photons. Since phase error may occur if the polarization states do not match during phase modulation, the device may match the polarization states of photons included in the forward pulse. For example, the device may adjust the polarization states based on the basis used to generate the initial state of each photon, the results of classification by polarization, etc. Specifically, the device may reduce the number of applied polarization states based on the basis applied when transmitting each photon, classify photons by polarization state by forming a time difference using a polarization beam splitter, and then adjust the polarization state by classification.

In step S2603, the device performs phase modulation. In other words, the device performs phase modulation on photons whose polarization state is adjusted to a common state. The phase state applied to each photon depends on the bit value included in the message to be transmitted.

In step S2605, the device reconstructs the polarization state of the initial quantum state. Since the polarization states of the photons have been adjusted to a common state before phase modulation, the device returns the polarization state after phase modulation to its original state. For example, the device may reconstruct the polarization state based on the basis used to generate the initial state of each photon, the results of classification by polarization, etc. Specifically, the device may classify photons by original polarization state based on the time difference formed using a polarization beam splitter and then reconstruct the polarization state by classification. Additionally, the device may reconstruct the polarization state based on the basis applied during transmission of each photon.

In step S2607, the device performs polarization modulation. In other words, the device performs polarization modulation on photons with the reconstructed polarization states. The polarization state applied to each photon depends on the bit value included in the message to be transmitted.

According to the various embodiments described above, the dimension of the quantum direct communication scheme, which was limited to the existing two-dimensional quantum information transmission scheme supporting 1 bit/photon transmission, can be increased. In other words, the present disclosure presents an efficient method to solve the problem of not being able to increase the data rate due to hardware constraints through a software approach. In order to check the performance of the proposed technology, the effect of improving the data rate according to the transmission distance is verified through comparison between the existing two-dimensional polarization-based quantum direct communication technology and the proposed scheme with increased dimension as described above, as shown in FIG. 27 below.

Figure 27:
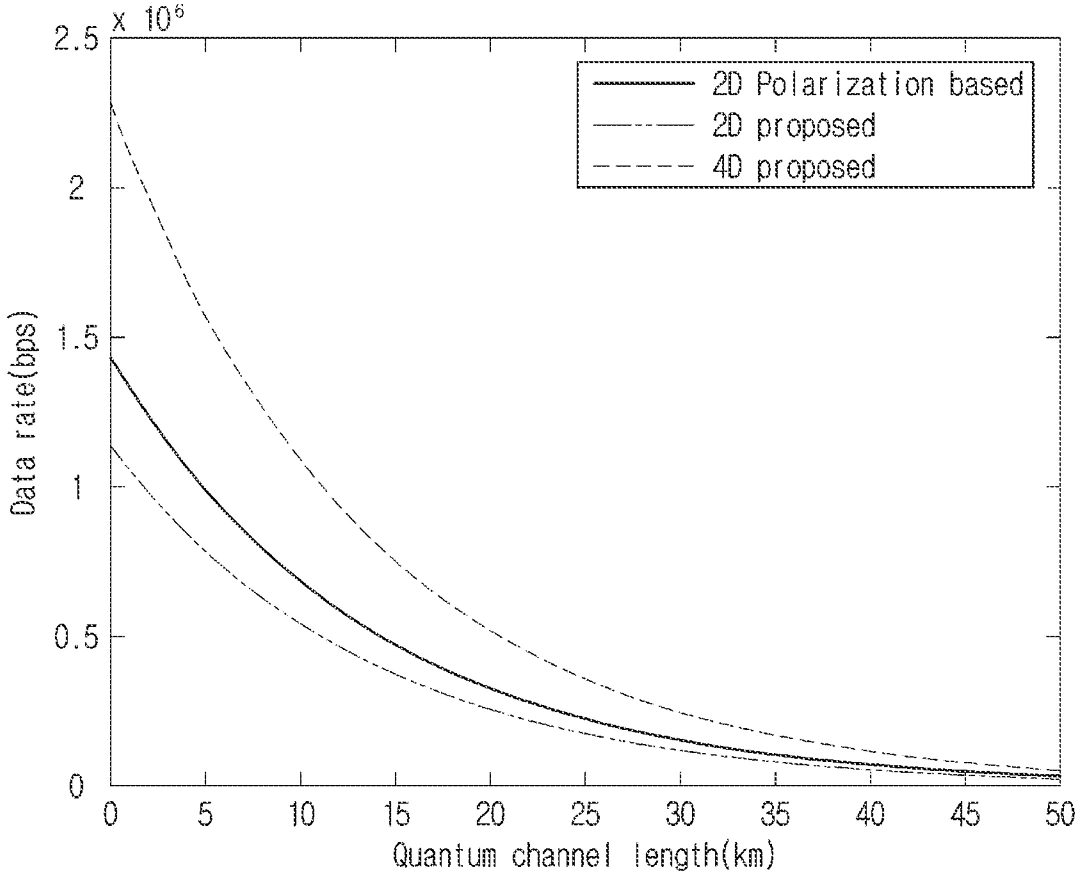
FIG. 27 illustrates the data rate according to the transmission distance of quantum secure direct communication according to an embodiment of the present disclosure.

FIG. 27 illustrates the data rate according to the transmission distance of quantum secure direct communication according to an embodiment of the present disclosure. FIG. 27 illustrates simulation results for data rate according to transmission distance. The main parameters applied to calculate the data rate in FIG. 27 are shown in [Table 11] below.

TABLE 11

| parameter | value |
|---|---|
| Repetition rate = f | 100 MHz |
| Mean photon number = μ | 1 |
| Detection efficiency = β | 0.8 |
| Loss of quantum channel = α | 0.16 dB/km |
| Length of the quantum channel | l |
| Loss of Alice side | $L_A$ |
| Loss of Bob side | $L_B$ |
| Dimension(d) factor = γ | d/2 |
| Rate of data state = α | 0.9 (rate used for message coding in the initial state) |

Based on the parameters defined as in [Table 11], the data rate according to the transmission distance may be defined as follows [Equation 1].

$$R = \alpha \cdot f \cdot \mu \cdot \beta \cdot \gamma \cdot 10^{-(\alpha \cdot l + L_A + L_B)} \quad \text{[Equation 1]}$$

In [Equation 1], R denotes the data rate, a denotes the loss of the quantum channel, f denotes the repetition rate, μ denotes the mean photon number, β denotes detection efficiency, γ denotes the dimension factor, and l denotes the length of the quantum channel, $L_A$ denotes the loss of Alice side, and $L_B$ refers to the loss of Bob side.

In FIG. 27, 2D Polarization based refers to the existing polarization-based 2D QSDC scheme, and 2D/4D proposed refers to 2D and 4D QSDC protocol according to various embodiments. Referring to FIG. 27, it is confirmed that the data rate is improved by improving from 2D to 4D. Comparing at a transmission distance of 5 km, the proposed 4D scheme provides a data rate of 1.58 Mbps, the proposed 2D scheme provides a data rate of 0.79 Mbps, and the existing polarization-based 2D scheme provides a data rate of 0.99 Mbps. Therefore, it is confirmed that the proposed techniques result in performance improvement of about 1.6 times compared to the prior art at a transmission distance of 5 km.

Comparing the existing scheme and the proposed 2D scheme, the data rate of the existing scheme is relatively higher. This result is because the proposed technique requires the use of more components because transmission and detection of not only polarization but also phase information are performed for high-dimensional information transmission, and thus additional loss occurs. However, when increasing the transmission dimension of quantum information, the proposed scheme does not require additional resources. Therefore, as high-dimensional transmission is performed, the effect of improving the data rate is increased compared to the existing polarization-based 2D scheme.

Application Example of Embodiment

In a communication system, devices may perform quantum communication. At this time, according to the various embodiments described above, devices operating as Alice and Bob can increase the efficiency of the quantum channel by applying two or more modulations, for example, phase modulation and polarization modulation, to one photon. This high-dimensional quantum communication technology may be applied to communication between various devices. For example, in communication between a base station and a terminal, quantum communication may be performed according to the various embodiments described above. An example of operations of a base station and a terminal to which a quantum communication procedure according to various embodiments is applied is shown in FIG. 28 below.

Figure 28:
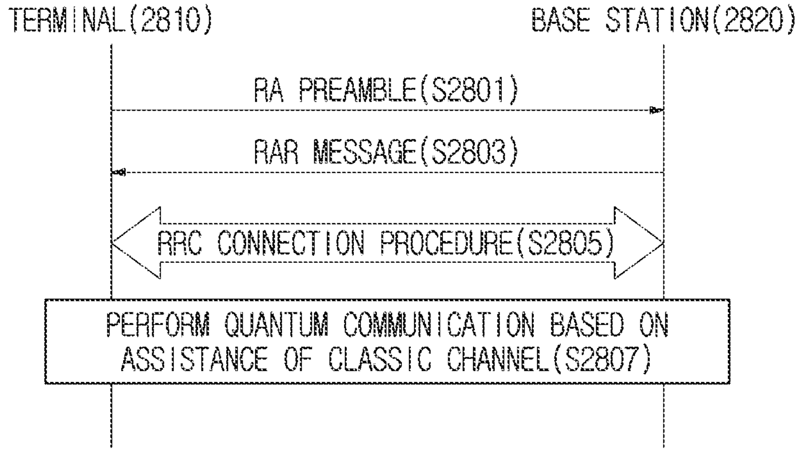
FIG. 28 illustrates an example of a procedure for performing communication in a communication system according to an embodiment of the present disclosure.

FIG. 28 illustrates an example of a procedure for performing communication in a communication system according to an embodiment of the present disclosure. FIG. 28 illustrates signal exchange between a terminal 2810 and a base station 2820.

Referring to FIG. 28, in step S2801, the terminal 2810 transmits a random access (RA) preamble to the base station 2820. The RA preamble is transmitted through the RACH set by the base station 2820, and information about the RACH (e.g., resource location, etc.) may be obtained from system information broadcast by the base station 2820.

In step S2803, the base station 2820 transmits a random access response (RAR) message to the terminal 2810. That is, the terminal 2810 may receive the RAR from the base station 2820 as a response to the RA preamble.

In step S2805, the terminal 2810 and the base station 2820 perform an RRC connection procedure. To this end, at least one message related to RRC connection establishment between the terminal 2810 and the base station 2820 may be transmitted and received. Through this, an RRC layer connection may be established between the terminal 2810 and the base station 2820.

In step S2807, the terminal 2810 and the base station 2820 perform quantum communication based on assistance of a classic channel. That is, the terminal 2810 and the base station 2820 exchange information to assist quantum communication through the classic channel connected through steps S2801, S2803, and S2805, and quantum communication may be performed based on the information exchanged through the classic channel. At this time, according to various embodiments, among the terminal 2810 and the base station 2820, a device operating as Alice may transmit a message through a pulse modulated using a combination of phase and polarization, and a device operating as Bob may receive a message by measuring phase and polarization. For example, at least one of the terminal 2810 and the base station 2820 may perform one of the procedures of FIGS. 22, 23, 24, 25, and 26.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL AVAILABILITY

The embodiments of the present disclosure are applicable to various radio access systems. Examples of the various radio access systems include a $3^{rd}$ generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

The invention claimed is:

1. A method performed by a first device in a communication system, the method comprising:
- receiving, from a second device, a random access (RA) preamble;
- transmitting, to the second device, an RA response (RAR) message;
- establishing a channel with the second device, the channel comprising a classic channel and a quantum channel;

transmitting, to the second device through the classic channel, information related to a basis used to generate photons in an initial quantum state;

transmitting a forward pulse including the photons in the initial quantum state to the second device;

receiving, from the second device through the classic channel, information related to a result of measurement performed by the second device on the initial quantum state of a first portion of the photons; and receiving, from the second device, a backward pulse representing a plurality of bits per photon, wherein the backward pulse is generated by phase modulation and polarization modulation performed by the second device on a second portion of the photons, which are remaining photons, based on the information related to the basis and the result of the measurement, wherein the channel is established to perform quantum communication, and wherein the classic channel connected through a radio resource control (RRC) connection procedure following the RA preamble and the RAR message is for exchange of information related to the quantum communication.

2. A method performed by a second device in a communication system, the method comprising:

transmitting, to a first device, a random access (RA) preamble;

receiving, from the first device, an RA response (RAR) message;

establishing a channel with the first device, the channel comprising a classic channel and a quantum channel;

receiving, from the first device through the classic channel, information related to a basis used by the first device to generate photons in an initial quantum state;

receiving a forward pulse including the photons from the first device;

measuring the initial quantum states of a first portion of the photons included in the forward pulse;

encoding a message by performing phase modulation and polarization modulation on a second portion of the photons, which are remaining photons of the forward pulse, based on the received information related to the basis and a result of the measuring; and transmitting, to the first device, a backward pulse representing a plurality of bits per photon based on the modulated second portion of the photons, wherein the channel is established to perform quantum communication, and wherein the classic channel connected through a radio resource control (RRC) connection procedure following the RA preamble and the RAR message is for exchange of information related to the quantum communication.

3. A first device in a communication system, the first device comprising:

a transceiver; and a processor connected to the transceiver, wherein the processor is configured to:

receive, from a second device, a random access (RA) preamble;

transmit, to the second device, an RA response (RAR) message;

establish a channel with the second device, the channel comprising a classic channel and a quantum channel;

transmit, to the second device through the classic channel, information related to a basis used to generate photons in an initial quantum state;

transmit a forward pulse including the photons in the initial quantum state to the second device;

receive, from the second device through the classic channel, information related to a result of measurement performed by the second device on the initial quantum state of a first portion of the photons; and receive, from the second device, a backward pulse representing a plurality of bits per photon, wherein the backward pulse is generated by phase modulation and polarization modulation performed by the second device on a second portion of the photons, which are remaining photons, based on the information related to the basis and the result of the measurement, wherein the channel is established to perform quantum communication, and wherein the classic channel connected through a radio resource control (RRC) connection procedure following the RA preamble and the RAR message is for exchange of information related to the quantum communication.

4. The method of claim 1, comprising:

suspending quantum communication based on an error rate of the quantum channel determined based on the result of the measurement being greater than a threshold.

5. The method of claim 1, further comprising obtaining a message included in the backward pulse based on the quantum state of the photons included in the backward pulse.

6. The method of claim 5, wherein the quantum state of the photons included in the backward pulse is measured based on the basis used to generate the initial quantum state of the photons included in the forward pulse.

7. The method of claim 5, wherein the obtaining the message comprises, estimating an error rate of the quantum channel using dummy bits included in the backward pulse; and decoding the message included in the backward pulse based on at least one decoding parameter determined based on the error rate.

8. The method of claim 2, further comprising: generating the backward pulse including bits of the message based on the information related to the basis.

9. The method of claim 2, further comprising:

adjusting the second portion of the photons to a common polarization state;

performing phase modulation on photons having the common polarization state;

reconstructing the polarization state of phase-modulated photons to the polarization state of the initial quantum state; and performing polarization modulation on the photons having the reconstructed polarization state.

10. The method of claim 2, further comprising:

transmitting information related to the result of the measuring to the first device through the classic channel.

11. The method of claim 10, wherein the measuring the initial quantum states comprises:

measuring the polarization state of the initial quantum state based on a time difference generated by two paths with different lengths branched according to the polarization state; and measuring a phase state of the initial quantum state based on interference between two signals included in a pair of photons.

12. The method of claim 2, wherein the backward pulse comprises dummy bits for estimating an error rate for the quantum channel in the first device.

13. The method of claim 12, further comprising:

transmitting information related to the dummy bits to the first device through the classic channel.

14. The first device of claim 3, wherein the processor is further configured to:

suspend quantum communication based on an error rate of the quantum channel determined based on the result of the measurement being greater than a threshold.

15. The first device of claim 3, wherein the processor is further configured to:

obtain a message included in the backward pulse based on the quantum state of the photons included in the backward pulse.

16. The first device of claim 15, wherein the quantum state of the photons included in the backward pulse is measured based on the basis used to generate the initial quantum state of the photons included in the forward pulse.

17. The first device of claim 15, wherein the processor is further configured to:

estimate an error rate of the quantum channel using dummy bits included in the backward pulse; and decode the message included in the backward pulse based on at least one decoding parameter determined based on the error rate.

* * * * *